United States Patent
Kim et al.

(10) Patent No.: US 10,200,097 B2
(45) Date of Patent: Feb. 5, 2019

(54) ENHANCED ANTENNA ARRAY TRAINING

(71) Applicant: QUALCOMM Incorporated, San Diego, CA (US)

(72) Inventors: Beomsup Kim, Los Altos Hills, CA (US); Ning Zhang, Saratoga, CA (US); Xiaoxin Zhang, Sunnyvale, CA (US); Youhan Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/470,500

(22) Filed: Mar. 27, 2017

(65) Prior Publication Data

US 2017/0279507 A1    Sep. 28, 2017

Related U.S. Application Data

(60) Provisional application No. 62/314,341, filed on Mar. 28, 2016.

(51) Int. Cl.
*H04B 7/06* (2006.01)
*H04B 7/0456* (2017.01)
(Continued)

(52) U.S. Cl.
CPC ......... *H04B 7/0456* (2013.01); *H04B 7/0617* (2013.01); *H04B 7/0691* (2013.01);
(Continued)

(58) Field of Classification Search
CPC .. H04B 7/0456; H04B 17/327; H04B 7/0617; H04B 7/0691; H04B 7/0865;
(Continued)

(56) References Cited

U.S. PATENT DOCUMENTS

2008/0232325 A1* 9/2008 Mehta ................... H04B 7/061
                                                                370/332
2009/0290563 A1* 11/2009 Gu ....................... H04B 7/0608
                                                                370/338
(Continued)

FOREIGN PATENT DOCUMENTS

EP          2168255 A1     3/2010

OTHER PUBLICATIONS

ISA/EP, International Search Report and Written Opinion of the International Searching Authority, Int'l Application No. PCT/US2017/024555, dated Jul. 5, 2017, European Patent Office, Rijswijk, NL, 14 pgs.

(Continued)

*Primary Examiner* — Janice N Tieu
(74) *Attorney, Agent, or Firm* — Holland & Hart LLP/Qualcomm

(57) ABSTRACT

Methods, systems, and devices for wireless communication are described. An access point (AP) may switch antenna array configurations during reception of a packet to determine channel characteristic information for the antenna array configurations. The AP may use the channel characteristic information to select an antenna array configuration for use, and to determine a beamforming steering matrix for the selected antenna array configuration. In some cases, the AP may use multiple antenna array configurations to transmit training fields in the preamble of a packet. The AP may receive channel characteristic information for each of the antenna array configurations. The AP may use the channel characteristic information to select an antenna array configuration for use, and to determine a beamforming steering matrix for the selected antenna array configuration.

24 Claims, 17 Drawing Sheets

(51) Int. Cl.
    *H04B 17/327*     (2015.01)
    *H04B 7/08*     (2006.01)
    *H04L 25/02*     (2006.01)
    *H04W 84/12*     (2009.01)
    *H04W 88/08*     (2009.01)

(52) U.S. Cl.
    CPC ......... *H04B 7/0865* (2013.01); *H04B 7/0874* (2013.01); *H04B 17/327* (2015.01); *H04L 25/0202* (2013.01); *H04W 84/12* (2013.01); *H04W 88/08* (2013.01)

(58) Field of Classification Search
    CPC .. H04B 7/0874; H04L 25/0202; H04W 84/12; H04W 88/08
    See application file for complete search history.

(56) References Cited

U.S. PATENT DOCUMENTS

2010/0260138 A1*  10/2010  Liu ..................... H04L 5/0023
                                                                   370/330
2017/0317869 A1*  11/2017  Zhang ................. H04L 1/0693

OTHER PUBLICATIONS

Perahia et al., "Gigabit Wireless LANs: An Overview of IEEE 802.11ac and 802.11AD," ACM SIGMOBILE Mobile Computing and Communications Review, Nov. 29, 2011, 11 pgs., vol. 15, No. 3, ISSN: 1559-1662, DOI: 10.1145/2073290.2073294.

* cited by examiner

ENHANCED ANTENNA ARRAY TRAINING

CROSS REFERENCES

The present application for patent claims priority to U.S. Provisional Patent Application No. 62/314,341 by Kim, et al., entitled "Enhanced Antenna Array Training," filed Mar. 28, 2016, assigned to the assignee hereof, and expressly incorporated by reference herein.

BACKGROUND

The present disclosure relates to wireless communication, and more specifically to enhanced antenna array training.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as Wi-Fi (e.g., IEEE 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

An AP may communicate via UL or DL using one or more antennas. In some cases, an AP may use beamforming to focus the energy of a transmission towards one or more STAs. To use beamforming, the AP may gather information about the wireless channel between the AP and the STA(s). For example, the AP may gather the channel information via a channel sounding process that involves a number of packet exchanges between the AP and the target STA(s). However, channel sounding processes may be time consuming, for example due to a large number of packets exchanged between the AP and STA(s). In some cases, the channel conditions may change by the time the AP transmits beamformed packets to a STA using the channel information (e.g., the channel information may be outdated). These channel sounding approaches may also be inappropriate when the antennas are in an antenna array and a number of different antenna array configurations can be selected for use by the transmitter (e.g., by the AP). In some approaches, an AP may use a predetermined configuration of antennas. But the predetermined configuration may only be appropriate for certain channel conditions.

SUMMARY

An access point (AP) may switch antenna array configurations during reception of a packet to determine channel characteristic information for each of the antenna array configurations. The AP may use the channel characteristic information to select an antenna array configuration for use, and to determine a beamforming steering matrix for the selected antenna array configuration. In some cases, the AP may use multiple antenna array configurations to transmit training fields in the preamble of a packet. The AP may receive channel characteristic information for each of the antenna array configurations. The AP may use the channel characteristic information to select an antenna array configuration, and to determine a beamforming steering matrix for the selected antenna array configuration.

An apparatus is described. The apparatus may include a memory that stores instructions and a processor coupled with the memory. The processor and the memory may be configured to switch between a plurality of antenna array configurations during reception of a first wireless local area network (WLAN) packet, determine channel characteristic information associated with the plurality of antenna array configurations based at least in part on the reception of the first WLAN packet, and transmit a second WLAN packet using an antenna array configuration selected from the plurality of antenna array configurations based at least in part on the determined channel characteristic information.

A method of wireless communication is described. The method may include switching between a plurality of antenna array configurations during reception of a first WLAN packet, determining channel characteristic information associated with the plurality of antenna array configurations based at least in part on the reception of the first WLAN packet, and transmitting a second WLAN packet using an antenna array configuration selected from the plurality of antenna array configurations based at least in part on the determined channel characteristic information.

A further apparatus for wireless communication is described. The apparatus may include means for switching between a plurality of antenna array configurations during reception of a first WLAN packet, means for determining channel characteristic information associated with the plurality of antenna array configurations based at least in part on the reception of the first WLAN packet, and means for transmitting a second WLAN packet using an antenna array configuration selected from the plurality of antenna array configurations based at least in part on the determined channel characteristic information.

A non-transitory computer readable medium for wireless communication is described. The non-transitory computer-readable medium may include instructions to cause a processor to switch between a set of antenna array configurations during reception of a first WLAN packet, determine channel characteristic information associated with the set of antenna array configurations based on the reception of the first WLAN packet, and transmit a second WLAN packet using an antenna array configuration selected from the set of antenna array configurations based on the determined channel characteristic information.

Some examples of the method, apparatus, or non-transitory computer-readable medium described above may further include processes, features, means, or instructions for calculating a beamforming steering matrix based at least part on the selected antenna array configuration and the determined channel characteristic information, where the second WLAN packet is beamformed according to the beamforming steering matrix. In some examples of the method, apparatus, or non-transitory computer-readable medium described above, switching includes switching between the set of antenna array configurations during an extension portion of the packet, where the extension portion of the packet is appended to the packet after a data portion of the packet.

Some examples of the method, apparatus, or non-transitory computer-readable medium described above may further include processes, features, means, or instructions for receiving a third WLAN packet with the selected antenna array configuration, where the channel characteristic information includes signal power of the first WLAN packet. Some examples of the method, apparatus, or non-transitory computer-readable medium described above may further include processes, features, means, or instructions for estimating a channel over which the third WLAN packet was conveyed.

Some examples of the method, apparatus, or non-transitory computer-readable medium described above may further include processes, features, means, or instructions for calculating a beamforming steering matrix based at least part on the selected antenna array configuration and the channel estimation, where the second WLAN packet is beamformed according to the beamforming steering matrix. In some examples of the method, apparatus, or non-transitory computer-readable medium described above, switching further includes switching between the set of antenna array configurations during the data portion of the packet.

Some examples of the method, apparatus, or non-transitory computer-readable medium described above may further include processes, features, means, or instructions for determining a portion of the first WLAN packet to switch antenna configurations based on a number of antenna array configurations of the set of antenna array configurations and a length of an extension portion of the first WLAN packet. In some examples of the method, apparatus, or non-transitory computer-readable medium described above, the first WLAN packet comprises a data packet, an acknowledgement (ACK) packet, a probe request packet, an association request packet, a channel reservation response packet such as a clear to send (CTS) etc., or some combination of these. In some examples of the method, apparatus, or non-transitory computer-readable medium described above, the first WLAN packet is a single user (SU) WLAN packet.

Some examples of the method, apparatus, or non-transitory computer-readable medium described above may further include processes, features, means, or instructions for switching between the set of antenna array configurations during reception of a third WLAN packet that is a second multi-user (MU) transmission from a second station, where the channel characteristic information for the set of antenna array configurations is determined based on the reception of the first WLAN packet and the reception of the third WLAN packet, and where the first WLAN packet is a first MU transmission from a first station. In some examples of the method, apparatus, or non-transitory computer-readable medium described above, the channel characteristic information is at least one of a signal power, or a signal-to-noise ratio (SNR), or a channel estimation, or a combination thereof.

A further apparatus is described. The apparatus may include a memory that stores instructions and a processor coupled with the memory. The processor and the memory may be configured to identify a plurality of antenna array configurations and transmit a WLAN preamble comprising a plurality of training fields, wherein the plurality of training fields are transmitted using the identified plurality of antenna array configurations.

A further method of wireless communication is described. The method may include identifying a plurality of antenna array configurations and transmitting a WLAN preamble comprising a plurality of training fields, wherein the plurality of training fields are transmitted using the identified plurality of antenna array configurations.

A further apparatus for wireless communication is described. The apparatus may include means for identifying a plurality of antenna array configurations and means for transmitting a WLAN preamble comprising a plurality of training fields, wherein the plurality of training fields are transmitted using the identified plurality of antenna array configurations.

A further non-transitory computer readable medium for wireless communication is described. The non-transitory computer-readable medium may include instructions to cause a processor to identify a set of antenna array configurations and transmit a WLAN preamble comprising a set of training fields, where the set of training fields are transmitted using the identified set of antenna array configurations.

Some examples of the method, apparatus, or non-transitory computer-readable medium described above may further include processes, features, means, or instructions for receiving, in response to the WLAN preamble, channel characteristic information corresponding to the set of antenna array configurations, where the channel characteristic information is based on the set of training fields. Some examples of the method, apparatus, or non-transitory computer-readable medium described above may further include processes, features, means, or instructions for selecting an antenna array configuration of the set of antenna array configurations based on the channel characteristic information.

Some examples of the method, apparatus, or non-transitory computer-readable medium described above may further include processes, features, means, or instructions for computing a beamforming steering matrix based on the channel characteristic information corresponding to the selected antenna array configuration. Some examples of the method, apparatus, or non-transitory computer-readable medium described above may further include processes, features, means, or instructions for transmitting, using the selected antenna array configuration, a second WLAN preamble comprising multiple training fields. Some examples of the method, apparatus, or non-transitory computer-readable medium described above may further include processes, features, means, or instructions for receiving, in response to the second WLAN preamble, channel estimation information for the selected antenna array configuration.

Some examples of the method, apparatus, or non-transitory computer-readable medium described above may further include processes, features, means, or instructions for computing a beamforming steering matrix for use with the selected antenna array configuration in a subsequent transmission based on the channel estimation information. Some examples of the method, apparatus, or non-transitory computer-readable medium described above may further include processes, features, means, or instructions for receiving, from a second station and in response to the MU preamble, additional channel characteristic information corresponding to the set of antenna array configurations and based on the set of training fields, where selecting the antenna array configuration is based on the channel characteristic information and the additional channel characteristic information, where the WLAN preamble comprises a MU preamble, and where the received channel characteristic information is received from a first station.

Some examples of the method, apparatus, or non-transitory computer-readable medium described above may further include processes, features, means, or instructions for transmitting, prior to transmission of the WLAN preamble, an announcement packet comprising an indication that the WLAN preamble will include the set of training fields. In some examples of the method, apparatus, or non-transitory computer-readable medium described above, the announcement packet comprises a null data packet announcement (NDPA). In some examples, the announcement packet comprises a field requesting a type of channel characteristic information in response to the WLAN preamble. In some examples of the method, apparatus, or non-transitory computer-readable medium described above, the WLAN preamble is included in a null data packet (NDP). In some examples of the method, apparatus, or non-transitory computer-readable medium described above, the WLAN preamble is a multi-user preamble or a single-user preamble.

In some examples of the method, apparatus, or non-transitory computer-readable medium described above, the WLAN preamble comprises a signal field comprising at least one of an indication of a number of antenna array configurations of the set of antenna array configurations, an indication of a number of training fields of the set of training fields, or an indication of a number of training fields transmitted per antenna configuration, or a combination thereof. In some examples of the method, apparatus, or non-transitory computer-readable medium described above, each antenna array configuration of the set of antenna array configurations transmits one or more training fields of the set of training fields.

DETAILED DESCRIPTION

Figure 1:
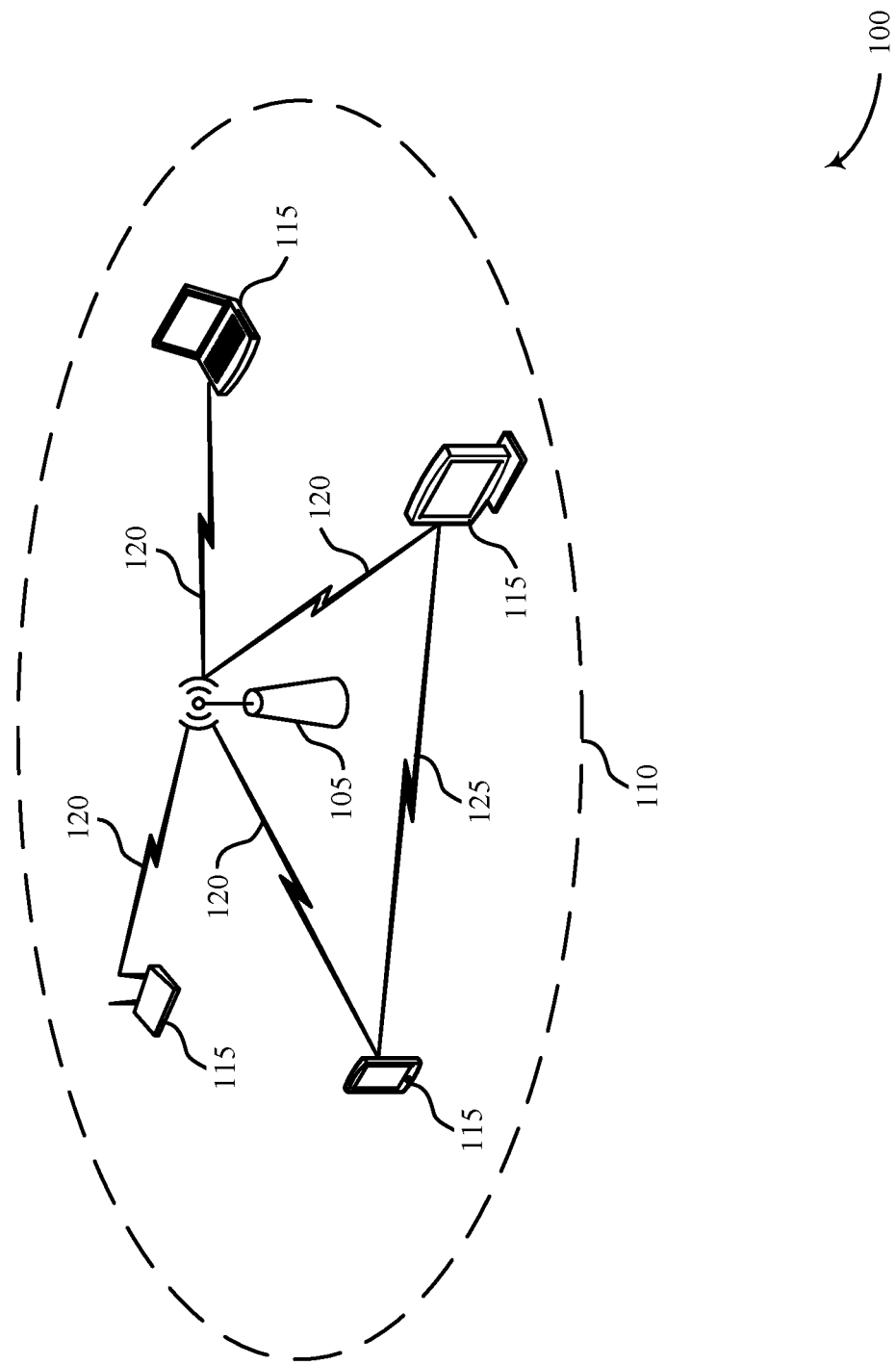
FIG. 1 illustrates an example of a wireless communications system that supports enhanced antenna array training in accordance with aspects of the present disclosure.

An access point (AP) may use an enhanced antenna array training process to determine channel characteristic information for multiple antenna array configurations. Some channel sounding approaches may involve multiple packets being sent and received by an AP in communication with a station (STA). These approaches may be slow and may not reflect short-term changes in channel conditions. As disclosed herein, enhanced antenna array training techniques may be used that speed up the training process and provide accurate channel information, even when there are short-term changes in channel conditions. The enhanced antenna array training process may be implicit or explicit, and may be used for single-user multiple-input multiple-output (SU-MIMO) communications or multi-user MIMO (MU-MIMO).

In an implicit antenna array training process, an AP (or another wireless device that uses an antenna array for transmission) may switch between multiple antenna array configurations during reception of a transmission (e.g., a packet) from a STA. For example, the AP may use different antenna array configurations to receive different portions of the packet. In some examples, fewer than all of the possible antenna array configurations of the AP may be used to receive the packet. In other examples, one or more of the same antenna array configurations may be used to receive the packet during different portions of the packet. The AP may evaluate the channel characteristic information (e.g., channel estimation information, power information, and/or signal-to-noise ratio (SNR) information) for each antenna array configuration to select the antenna array configuration (e.g., based on channel conditions). The AP may determine a beamforming steering matrix for the selected antenna array configuration using channel estimation information determined for that antenna array configuration during reception of the packet. The AP may then transmit a packet (e.g., to the STA) using the selected antenna array configuration and according to the beamforming steering matrix.

In some cases of implicit antenna array training, an AP may switch antenna array configurations during reception of an extension portion of a packet. Because the extension portion of a packet may not carry information or data, it may not be possible for the AP to perform channel estimation. Thus, the AP may use SNR or power to determine which antenna array configuration to use (e.g., the AP may select the antenna array configuration with the highest SNR or power). The selected antenna array configuration may be used to receive a second packet which the AP uses to perform channel estimation. The channel estimation information may then be used by the AP to compute the beamforming steering matrix for the select antenna array configuration. Thus, in implicit antenna array training an AP may switch antenna array configurations during reception of an entire packet or during one or more portions of a packet (e.g., an extension portion, or a data portion) to determine channel characteristic information for multiple antenna array configurations.

In an example of explicit antenna array training, an AP may use different antenna array configurations to send training fields of a preamble. For example, the AP may send a number of long training fields (LTFs) (e.g., high-efficiency LTFs (HE-LTFs)) within a single preamble using n different antenna array configurations. In some cases, each antenna array configuration used during the transmission of a preamble single may be used to send a single LTF in the preamble. In other examples, each antenna array configuration used during the transmission of the preamble may be used to send multiple LTFs in the preamble. STAs that receive the LTFs may determine channel characteristic information for each antenna array configuration used to transmit the preamble. The STAs may report the channel characteristic information for each antenna array configuration back to the AP (e.g., via compressed beamforming messages), which may use the channel information to select an antenna array configuration (e.g., based on the AP's determination that a certain antenna array configuration will have the highest performance). In some cases (e.g., when there is a one-to-one correspondence between a number of LTFs and antenna array configurations), the reported channel characteristic information may not include channel estimation information. In such cases, the AP may use the reported information (e.g., SNR and/or power information) to select the antenna array configuration that is to be used for a second channel sounding procedure. The second channel sounding procedure may provide channel estimation information that can be used by the AP to compute the beamforming matrix for the selected antenna array configuration.

FIG. 1 illustrates a wireless communications system 100 configured in accordance with aspects of the present disclosure. The wireless communications system 100 may be an example of a wireless local area network (WLAN) (also known as a Wi-Fi network, such as 802.11ax) and may include an AP 105 and multiple associated STAs 115. Devices in wireless communications system 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands. The STAs 115 may represent devices such as wireless communication terminals, including mobile stations, phones, personal digital assistant (PDA), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the wireless communications system 100. An extended network station associated with the wireless communications system 100 may be connected to a wired or wireless distribution system that may allow multiple APs 105 to be connected in an ESS.

In some cases, a STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The wireless communications system 100 may include APs 105 of different types (e.g., metropolitan area, home network, etc.), with varying and overlapping coverage areas 110. An AP 105 may communicate with a STA 115 via a communication link 120. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, 802.11ax, 802.11az, etc. In other implementations, peer-to-peer connections or ad hoc networks may be implemented within the wireless communications system 100.

An AP 105 may communicate with a STA 115 via uplink and downlink. Uplink transmissions may refer to transmissions from the STA 115 to the AP 105 and downlink transmissions may refer to transmissions from the AP 105 to the STA 115. A number of communication techniques may be used for the uplink and downlink transmissions. For example, a wireless device (e.g., an AP 105) may implement beamforming in which the energy of a transmission is focused in a particular direction (e.g., towards a STA 115, or a set of STAs 115). In some cases, multiple-input-multiple output (MIMO) techniques may be used for when the AP 105 and/or STA 115 involved in a communication include multiple antennas. In some cases, uplink and/or downlink multi-user MIMO (MU-MIMO) may be used. For example, uplink/downlink single-user MIMO (SU-MIMO) may be used in which multiple streams of data are simultaneously communicated (e.g., from an AP 105 to a STA 115) using multiple antennas and beamforming technology. In MU-MIMO, for example downlink MU-MIMO, an AP 105 may simultaneously send multiple streams to multiple STAs 115 by taking advantage of spatial diversity in transmission resources and multiple antennas.

Thus, an AP 105 may include multiple antennas, which may be referred to herein as an antenna array. An antenna array may be connected to a single transmit chain of AP 105, or to a number of different transmit chains. An AP 105 may position or orient antennas in an antenna array in a particular configuration, apply different beamforming weights to different antennas in the array, and/or use different amplitudes or phases for different antennas in the array. Each particular configuration may be associated with one or more transmit chains of AP 105. In some cases, an AP 105 may select a fraction of the antennas in an antenna array for a communication. The antennas selected for a communication, and/or their respective positions, orientations, and/or weights, may be referred to herein as an antenna array configuration.

An AP 105 may be capable of dynamically changing antenna array configurations. For example, an AP 105 may switch from a first antenna array configuration to a second antenna array configuration in between communications (e.g., the AP 105 may switch from a first antenna array configuration for communication of a first packet to a second antenna array configuration for communication of a second packet). According to the techniques described herein, an AP 105 may switch antenna array configurations during reception of a single packet (e.g., during a field of a single packet), or during transmission of a single preamble (e.g., during a field of a single preamble). The AP 105 may use antenna array configuration switching to perform antenna array training. Antenna array training may refer to the process of determining information about a channel (e.g., via a channel sounding procedure) for beamforming.

Figure 2:
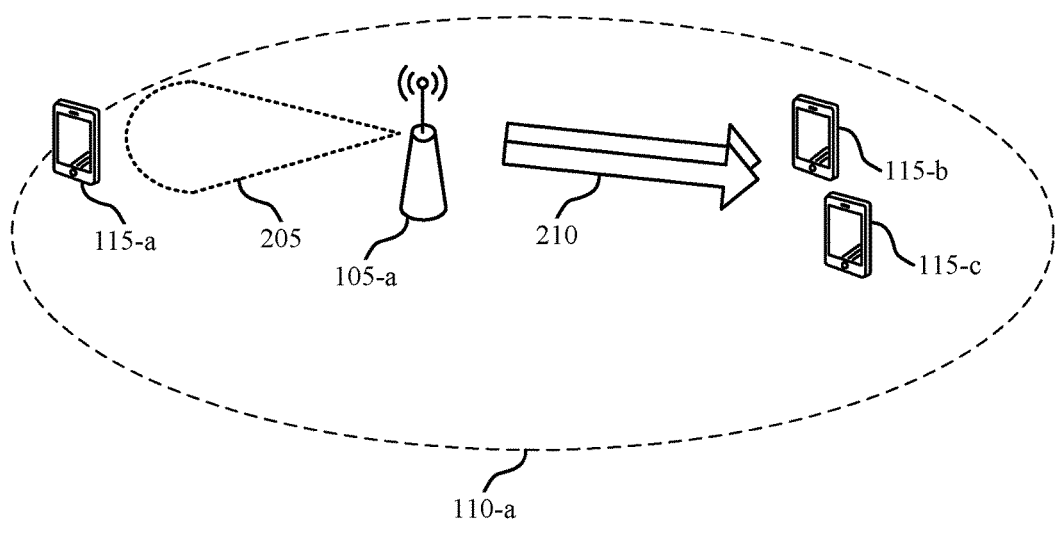
FIG. 2 illustrates an example of a wireless communications system that supports enhanced antenna array training in accordance with aspects of the present disclosure.

FIG. 2 illustrates an example of a wireless communications system 200 for enhanced antenna array training. Wireless communications system 200 may include AP 105-*a*, STA 115-*a*, STA 115-*b*, and STA 115-*c*, which may be examples of the corresponding devices described with reference to FIG. 1. AP 105-*a* may communicate with wireless devices inside coverage area 110-*a*. AP 105-*a* may communicate using a variety of techniques, including beamforming, SU-MIMO, and MU-MIMO. AP 105-*a* may communicate using an antenna array capable of multiple antenna array configurations, and may determine channel characteristic information for multiple antenna array configurations by switching between the antenna array configurations during reception or transmission of a single packet, or a portion of a single packet.

AP 105-*a* may communicate with STA 115-*a* using SU techniques and may communicate with STA 115-*b* and STA 115-*c* using MU techniques. In some cases, AP 105-*a* may use beamforming to send a SU or MU transmission. For example, AP 105-*a* may send a beamformed SU transmission 205 to STA 115-*a*. AP 105-*a* may also use beamforming techniques for MU transmission 210. Prior to sending a beamformed transmission over a channel, AP 105-*a* may gather information about the channel. AP 105-*a* (as beamformer) may use the information, which may be referred to herein as channel characteristic information, to determine a beamforming steering matrix that is used to direct transmissions towards the target device(s) (as beamformee(s)). The transmissions may be directed by applying weights to antennas within an antenna array so that constructive and destructive interference focuses the energy of the transmission in a particular direction.

According to the techniques described herein, AP 105-*a* may obtain channel characteristic information for multiple antenna array configurations via explicit antenna array training or implicit antenna array training. In explicit antenna array training, AP 105-*a* may send a null data packet (NDP) to intended beamformees (e.g., STA 115-*a* for SU, or STA 115-*b* and STA 115-*c* for MU). An announcement packet (e.g., an NPD announcement (NDPA) packet) may be transmitted to the intended beamformees prior to the NDP. The NDPA may secure the channel and identify the intended beamformees. In some cases, the NDPA is an enhanced NDPA that indicates that the next NDP will be an enhanced NDP that is transmitted using multiple antenna array configurations.

The NDP may follow the NDPA, and may be constructed so that a receiver can analyze orthogonal frequency division multiplexing (OFDM) training fields to calculate the channel response. The beamformee(s) may use the channel response to calculate a feedback matrix, which enables AP 105-*a* (e.g., the beamformer) to calculate the beamforming steering matrix. The beamformee(s) may compress the feedback matrix and send it to AP 105-*a* in a compressed beamforming (CBF) packet. If the NDP is an enhanced NDP, the NDP may include training fields that are transmitted by different antenna array configurations. Thus, a beamformee may determine, and send to AP 105-*a*, channel characteristic information (e.g., feedback matrix, SNR, or power information) for each antenna array configuration in an enhanced CBF.

In SU, AP 105-*a* may use the feedback matrix to construct a beamforming steering matrix for the beamformee. In MU, AP 105-*a* may use the feedback matrices to construct a beamforming steering matrix for each beamformee. If the CBF received by AP 105-*a* is an enhanced CBF, AP 105-*a* may first select an antenna array configuration to use based on the channel characteristics information, and then compute the channel steering matrix for said antenna array configuration. A CBF packet may include a feedback matrix and/or other channel characteristic information, such as SNR information or power information. In some cases, the feedback matrix or aspects of the feedback matrix may be referred to as channel estimation information. AP 105-*a* may use the channel characteristic information received from STAs 115 to determine which antenna array configuration to select.

In implicit antenna array training, AP 105-*a* may forego the channel sounding process described above and use regular packets (e.g., packets other than CBF or enhanced CBF packets) from a STA 115 to determine channel characteristic information for multiple antenna array configurations. For example, AP 105-*a* may use multiple antenna array configurations to receive a packet, or a portion of a packet. Channel characteristic information for each antenna array configuration may be determined from the portion of the packet received by each respective antenna array configuration. AP 105-*a* may select an antenna array configuration based on the channel characteristic information for each of the antenna array configurations used to receive the packet. AP 105-*a* may use the channel characteristic information to compute a beamforming steering matrix for the selected antenna array configuration, which may be used to beamform a packet to one or more STAs 115.

Therefore, an AP 105 may determine channel characteristic information for a channel by using multiple antenna array configurations to transmit or receive a single packet. The enhanced antenna array training techniques described herein may avoid multiple channel sounding processes, and thus may reduce latency, increase the speed and accuracy of antenna array configuration, and improve system performance.

Figure 3:
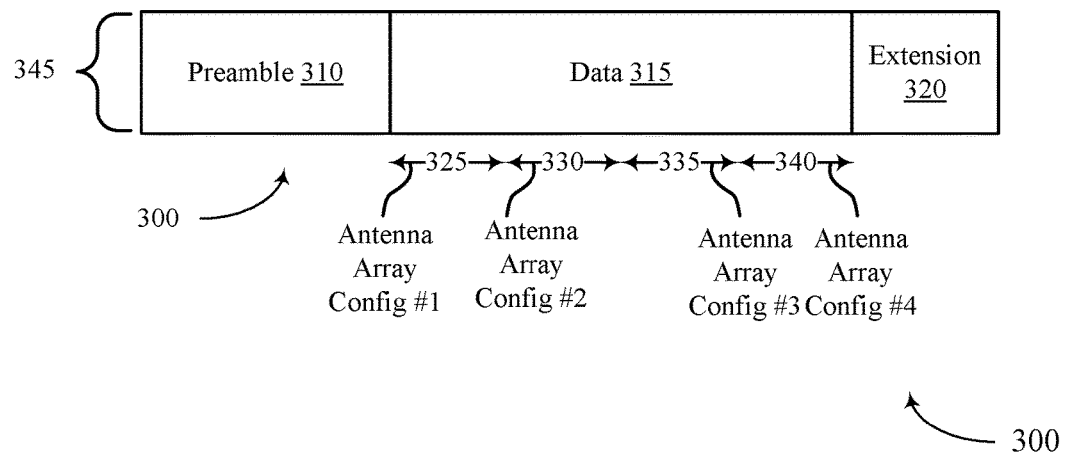
FIG. 3 illustrates an example of a data packet that supports enhanced antenna array training in accordance with aspects of the present disclosure.

FIG. 3 illustrates an example of a data packet 300 for enhanced antenna array training. Data packet 300 may be communicated (e.g., transmitted or received) by an AP 105 or STA 115 described with reference to FIG. 1. Data packet 300 may carry data (e.g., in data field 315) and may include a preamble 310, a data field 315, and an extension portion 320. Extension portion 320 may optionally be appended to data packet 300 after data field 315, and may not carry data or other information. In MU communications, data field 315 may include data for multiple STAs 115 (e.g., in different sub-channels across channel bandwidth 345).

An AP 105 that includes an antenna array may receive data field 315 using multiple antenna array configurations of the antenna array. In the example depicted in FIG. 3, the AP 105 uses a first antenna array configuration to receive a first portion of the data packet 300 during period 325, a second antenna array configuration to receive a second portion of the data packet 300 during period 330, a third antenna array configuration to receive a third portion of the data packet 300 during period 335, and a fourth antenna array configuration to receive a fourth portion of the data packet 300 during period 340. Thus, the AP 105 may receive different portions of the data field 315 using different antenna array configurations (e.g., by switching antenna array configurations during the reception of data packet 300). The duration of time an antenna array configuration is in use may be the same as another antenna array configuration of AP 105, or different.

The AP 105 may evaluate channel characteristic information for each antenna array configuration obtained during the respective reception periods. The AP 105 may use this channel characteristic information (e.g., SNR information or power information) to select an antenna array configuration for use, and to compute a beamforming steering matrix for the selected antenna array configuration. Although shown using four antenna array configurations, the techniques described herein may be implemented for any number of antenna array configurations.

Figure 4:
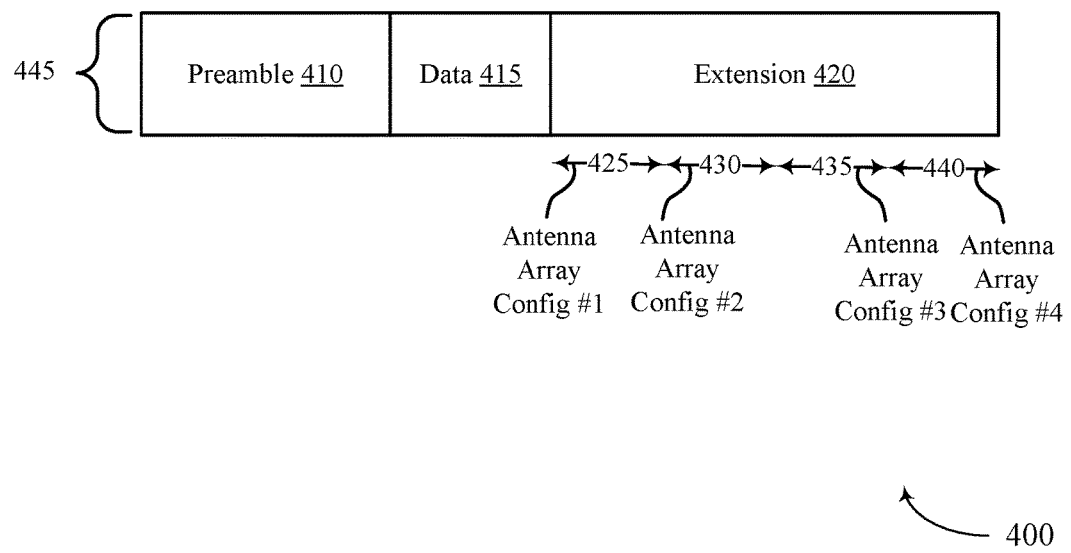
FIG. 4 illustrates an example of a data packet that supports enhanced antenna array training in accordance with aspects of the present disclosure.

FIG. 4 illustrates an example of a data packet 400 for enhanced antenna array training. Data packet 400 may be communicated (e.g., transmitted or received) by an AP 105 or STA 115 described with reference to FIG. 1. Data packet 400 may carry data (e.g., in data field 415) and may include a preamble 410, a data field 415, and an extension portion 420. Extension portion 420 may or may not carry data or other information. Data field 415 may include data for multiple STAs 115 (e.g., in different sub-channels across channel bandwidth 435).

An AP 105 that includes an antenna array may receive extension portion 420 using multiple antenna array configurations of the antenna array. In the example depicted in FIG. 4, the AP 105 uses a first antenna array configuration to receive a first portion of the extension portion 420 during period 425, a second antenna array configuration to receive a second portion of extension portion 420 during period 430, a third antenna array configuration to receive a third portion of the extension portion 420 during period 445, and a fourth antenna array configuration to receive a fourth portion of the extension portion 420 during period 440. Although shown using four antenna array configurations, the techniques described herein may be implemented for any number of antenna array configurations. The amount of time each antenna array configuration is in use may be constant for a certain period of time, or may vary.

Thus, an AP 105 may receive different portions of the extension portion 420 using different antenna array configurations. The AP 105 may evaluate channel characteristic information (e.g., SNR information or power information) for each antenna array configuration obtained during the respective reception periods. The AP 105 may use this channel characteristic information to select an antenna array configuration for use. Because the AP 105 may not be able to estimate the channel or compute a beamforming steering matrix (e.g., due to the lack of data carried by the extension portion 420), the AP 105 may receive another packet according to the techniques described herein to determine this information.

In some cases, AP 105 may determine that the extension portion 420 is not long enough for the AP 105 to switch between all of the antenna array configurations selected for reception. In such cases, the AP 105 may decide to use a fraction of the selected antenna array configurations to receive some or all of the data field 415. The AP 105 may use the remaining fraction of antenna array configurations to receive the extension portion. Thus, an AP 105 may receive various portions of a packet (e.g., the preamble 410, data field 415, and/or extension portion 420) using a variety of antenna array configurations.

Figure 5A:
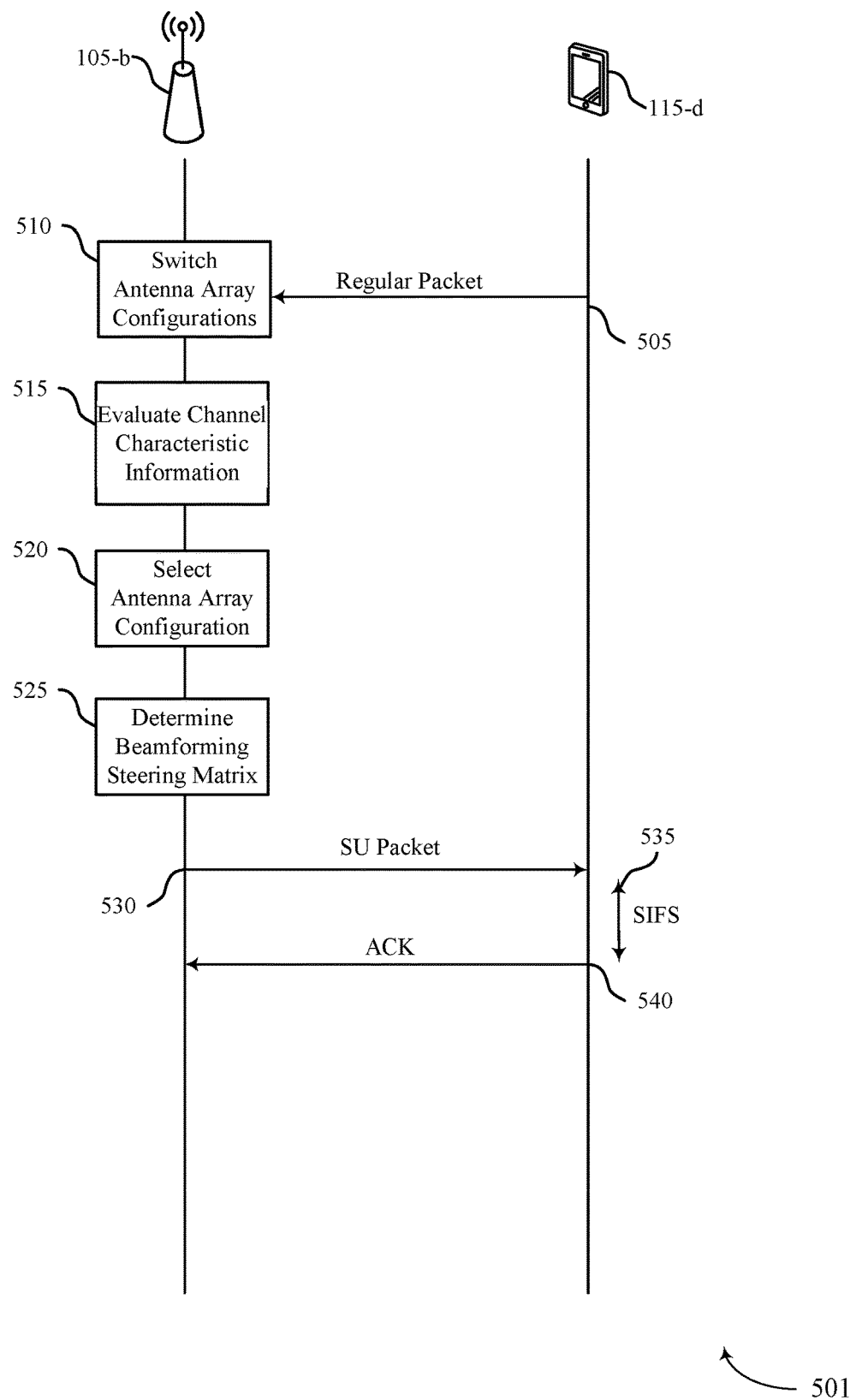
FIG. 5A illustrates an example of a process flow that supports enhanced antenna array training in accordance with aspects of the present disclosure.

FIG. 5A illustrates an example of a process flow 501 for enhanced antenna array training. In some cases, process flow 501 may represent aspects of techniques performed by an AP 105 or a STA 115 as described with reference to FIGS. 1-2. For example, process flow 501 may be an example of implicit antenna array training for SU transmissions (e.g., SU-MIMO). A process similar to process flow 501 may be implemented for implicit antenna array training for MU-MIMO, for example as described below with reference to process flow 502. AP 105-b may include an antenna array and may be capable of using different antenna array configurations of the antenna array. The antenna array may be connected to a transmit chain.

At 505, STA 115-d may send a regular packet to AP 105-b. A regular packet may be a packet that does not explicitly carry channel characteristic information (e.g., a data packet, an acknowledgement (ACK) packet a probe request packet, an association request packet, a channel reservation response packet such as a clear to send (CTS), etc., or some combination of these packets), as opposed to a packet that explicitly carries channel characteristic information (e.g., a CFB packet), or that is not in response to an NDP. At 510, AP 105-b may switch (e.g., sweep) antenna array configurations during reception of the packet (e.g., AP 105-b may use multiple antenna array configurations to receive the packet). Thus, different antenna array configurations may be used receive different portions of the same packet. At 515, AP 105-b may evaluate channel characteristic information determined from the regular packet. Channel characteristic information may have been obtained by AP 105-b for each of the antenna array configurations used during reception of the packet. The channel characteristic information may be evaluated for each antenna array configuration. The channel characteristic information may include SNR information, power information, and/or channel estimation information.

At 520, AP 105-b may select an antenna array configuration based on the channel characteristic information for each antenna array configuration. For example, AP 105-b may select the antenna array configuration that corresponds to the highest SNR or the highest power. At 525, AP 105-b may determine a beamforming steering matrix for the selected antenna array using the channel estimation information for the selected antenna array. In some examples, AP 105-b may use additional information (e.g., relating to other channel condition information) to determine the beamforming steering matrix. At 530, AP 105-b may transmit a SU packet to STA 115-d and the SU packet beamformed according to the beamforming steering matrix. At 540, after waiting a SIFS duration 535, STA 115-d may send an ACK packet back to AP 105-b.

Figure 5B:
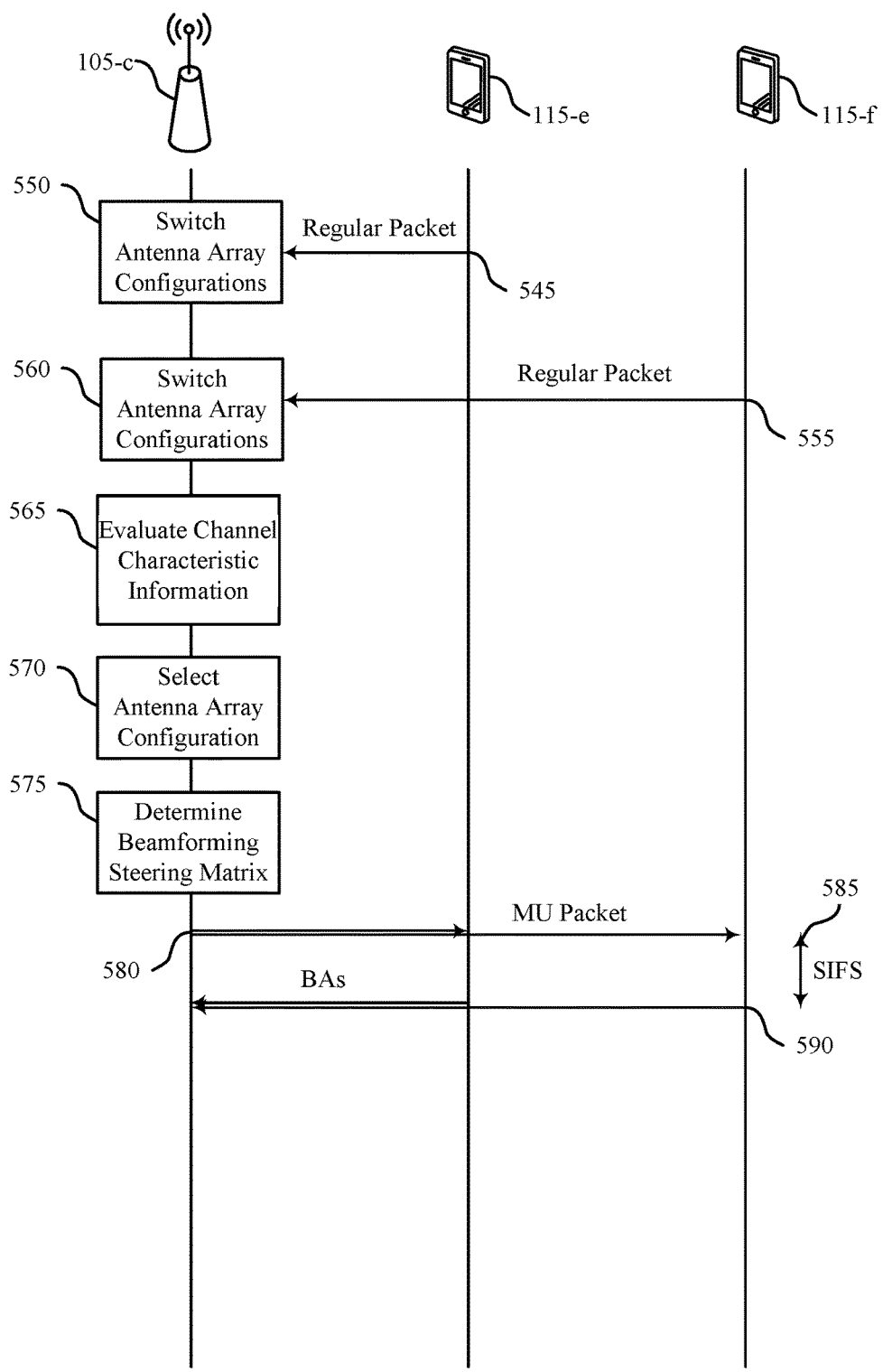
FIG. 5B illustrates an example of a process flow that supports enhanced antenna array training in accordance with aspects of the present disclosure.

FIG. 5B illustrates an example of a process flow 502 for enhanced antenna array training. In some cases, process flow 502 may represent aspects of techniques performed by an AP 105 or a STA 115 as described with reference to FIGS. 1-2. For example, process flow 502 may be an example of implicit antenna array training for MU-MIMO. AP 105-c may include an antenna array and may be capable of using different antenna array configurations of the antenna array.

At 545, STA 115-e may send a regular packet to AP 105-c. At 550, AP 105-c may switch (e.g., sweep) antenna array configurations during reception of all or portions of the packet (e.g., AP 105-c may use multiple antenna array configurations to receive the packet). Thus, different antenna array configurations may be used receive different portions of the same packet. At 555, a second STA, STA 115-f may send a regular packet to AP 105-c. At 560, AP 105-c may switch (e.g., sweep) antenna array configurations during reception of the packet. At 565, AP 105-c may evaluate channel characteristic information determined from the regular packet. The channel characteristic information may be evaluated for each antenna array configuration used during reception of the each MU packet.

At 570, AP 105-c may select an antenna array configuration based at least in part on the channel characteristic information for each antenna array configuration. At 575, AP 105 may determine a beamforming steering matrix for the selected antenna array using the channel estimation information for the selected antenna array. In some examples, AP 105-c may use additional information (e.g., relating to other channel condition information) to determine the beamforming steering matrix. At 580, AP 105-*c* may transmit a MU packet to STA 115-*e* and STA 115-*f*, the MU packet beamformed according to the beamforming steering matrix. At 590, after waiting a SIFS duration 585, STA 115-*e* and STA 115-*f* may send block acknowledgements (BAs) back to AP 105-*c*.

Figure 6:
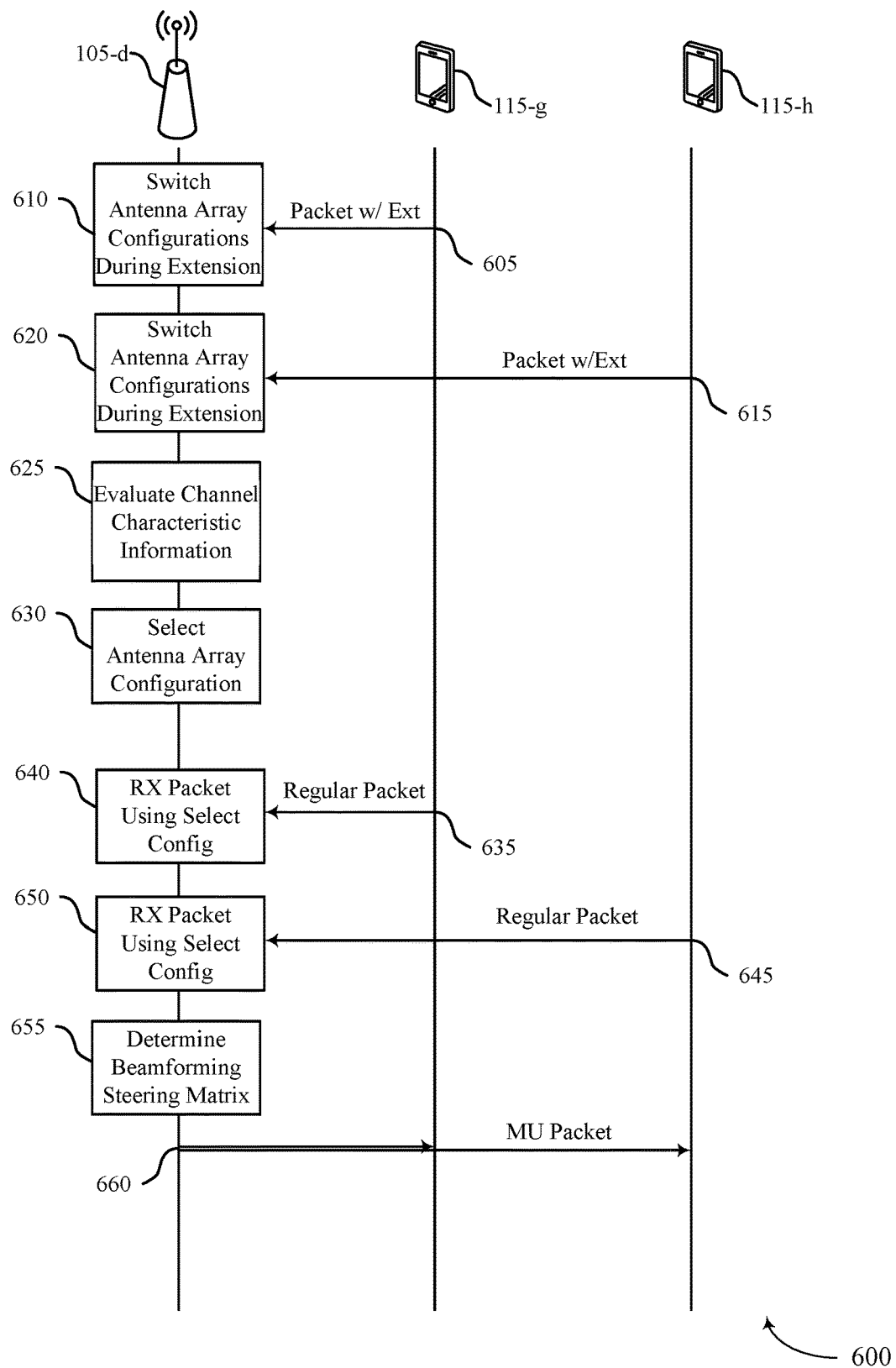
FIG. 6 illustrates an example of a process flow that supports enhanced antenna array training in accordance with aspects of the present disclosure.

FIG. 6 illustrates an example of a process flow 600 for enhanced antenna array training. In some cases, process flow 600 may represent aspects of techniques performed by an AP 105 or a STA 115 as described with reference to FIGS. 1-2. For example, process flow 600 may be an example of implicit antenna array training for MU-MIMO. A process similar to process flow 600 may be implemented for implicit antenna array training for SU-MIMO (e.g., by ignoring aspects of process flow 600 directed to STA 115-*h* and modifying aspects of process flow 600 directed to STA 115-*g* such that SU packets are transmitted and/or received). AP 105-*d* may include an antenna array and may be capable of using different antenna array configurations of the antenna array. The antenna array may be connected to one or more transmit chains of AP 105-*d*. In some examples, all the elements of the antenna array may be connected to a transmit chain, and the AP 105-*d* may selectively control and switch the transmission from the elements for the transmit chain.

At 605, STA 115-*g* may transmit a regular packet, including an extension portion (e.g., as further described above with reference to FIGS. 3-4), to AP 105-*d*. AP 105-*d* may, at 610, switch (e.g., sweep) antenna array configurations during the extension portion of the packet. That is, AP 105-*d* may receive different portions of the extension portion using different antenna array configurations. In some cases, a single antenna array configuration is used to receive the remaining portions (e.g., the preamble or data portion) of the packet. In other cases, the antenna array configurations may be swept during remaining portions of the packet (e.g., a data portion of the packet). AP 105 may determine which portions of the packet to switch antenna array configurations based on the number of antenna array configurations to be switched and/or based on the length of the extension portion (which may be signaled by the preamble of the packet). For example, if the length of the extension portion is inadequate to gather channel characteristic information for the number of antenna array configurations, AP 105-*d* may switch antenna array configurations during some or all of the data portion of the packet in addition to the extension portion of the packet.

At 615, STA 115-*h* may send a regular packet with an extension portion to AP 105-*d*. AP 105-*d* may, at 620, switch (e.g., sweep) antenna array configurations during the extension portion of the packet. In some cases, AP 105-*d* may also switch (e.g., sweep) antenna array configurations during a data portion of the packet. At 625, AP 105-*d* may evaluate the measured channel characteristics for each antenna array configuration for each packet. For example, AP 105-*d* may evaluate the SNR and/or power associated with each antenna array configuration for each packet. In some implementations, the extension portion of a packet may not carry data. As a result, AP 105-*d* may not be able to perform channel estimation using the packets. At 630, AP 105-*d* may select an antenna array configuration based on the channel characteristic information for each antenna array.

At 635, STA 115-*g* may transmit a regular packet to AP 105-*d*. The regular packet may include an extension portion. At 640, AP 105-*d* may receive the packet using the selected antenna array. At 645, STA 115-*h* may transmit a regular packet to AP 105-*d*. The regular packet may include an extension portion. At 650, AP 105-*d* may receive the packet using the selected antenna array. At 655, AP 105-*d* may determine (e.g., compute or calculate) a beamforming steering matrix using channel estimation information obtained from the packets received using the antenna array configuration selected at 630. At 660, AP 105-*d* may transmit a MU packet to STA 115-*g* and STA 115-*h* using the selected antenna array configuration and the corresponding beamforming matrix.

Figure 7A:
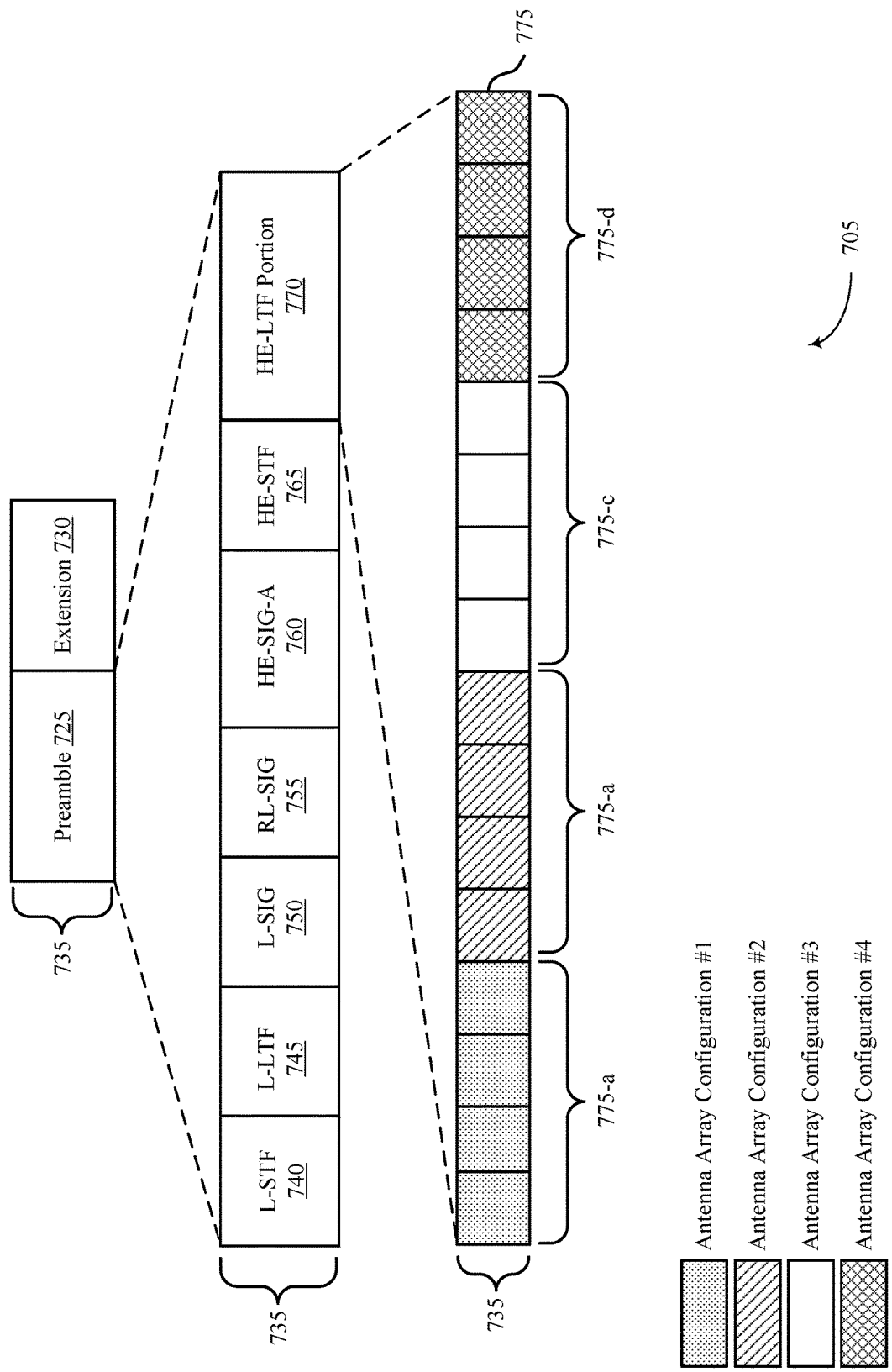
FIG. 7A illustrates an example of an enhanced null data packet that supports enhanced antenna array training in accordance with aspects of the present disclosure.

FIG. 7A shows an example of an enhanced NDP 705 for enhanced antenna array training in accordance with various aspects of the present disclosure. Enhanced NDP 705 may not carry data (e.g., enhanced NDP 705 may exclude a data field) and may include a preamble 725 and an extension portion 730. In some examples, extension portion 730 may not carry data. As described above, an NDP such as enhanced NDP 705 may be transmitted by an AP 105 for use by a STA 115 in determining channel characteristic information that can be reported back to the AP 105 for antenna array configuration selection and beamforming purposes. The bandwidth of enhanced NDP 705 may be bandwidth 735 (e.g. 20 MHz).

Preamble 725 may include legacy short training field (L-STF) 740, legacy long training field (L-LTF) 745, legacy signal (L-SIG) field 750, and repeated L-SIG (RL-SIG) field 755. L-STF 740 and L-LTF 745 may assist in frame identification and synchronization. L-SIG field 750 may indicate the data rate and length of the frame and RL-SIG field 755 may repeat the L-SIG content (e.g., to provide robustness). Preamble 725 may also include high-efficiency signal A (HE-SIG-A) field 760, which may carry common and user-specific control information, and high-efficiency short training field (HE-STF) field 765, which in some cases may include information corresponding to L-STF 740. Preamble 725 may also include an HE-LTF portion 770, which may be used for channel reservation and to determine frequency offsets and channel estimates. In some cases, HE-SIG-A field 760 may also include information regarding the HE-LTF portion 770.

HE-LTF portion 770 may include multiple HE-LTFs 775. In some examples, HE-LTF portions 770 in different preambles 725 may include different numbers of HE-LTFs (e.g., the HE-LTF portions 770 may be different lengths). According to the techniques described herein, multiple antenna array configurations may be used to transmit HE-LTFs 775 within HE-LTF portion 770. In one example, each antenna array configuration may be used to transmit multiple HE-LTFs 775. For instance, in HE-LTF portion 770, a first antenna array configuration may be used to transmit each of HE-LTFs 775-*a*, a second antenna array configuration may be used to transmit each of HE-LTFs 775-*b*, a third antenna array configuration may be used to transmit each of HE-LTFs 775-*c*, and a fourth antenna array configuration may be used to transmit each of HE-LTFs 775-*d*. The number of HE-LTFs transmitted per antenna array configuration may be referred to herein as $N_{HE-LTF}$. Thus, $N_{HE-LTF}=4$ for HE-LTF portion 770 as shown for enhanced NDP 705 (e.g., because there are four HE-LTFs associated with HE-LTFs 775-*a*). The total number of antenna arrays used to transmit HE-LTFs 775 for a single preamble 725 may be referred to herein as $N_{antenna-config}$. Thus, $N_{antenna-config}=4$ for HE-LTF portion 770 (e.g., because there are four HE-LTF sets: HE-LTFs 775-*a*, HE-LTFs 775-*b*, HE-LTFs 775-*c*, and HE-LTFs 775-*d*). The total number of HE-LTFs per preamble 725 may be referred to herein as $N_{HE-LTF-new}$ and may be equal to the total number of antenna array configurations multiplied by the number of HE-LTFs transmitted per antenna array configuration (e.g., $N_{antenna-config} \times N_{HE-LTF}$).

Thus, $N_{HE\text{-}LTF\text{-}new}=16$ for HE-LTF portion 770. According to the techniques described herein, HE-SIG-A field 760 may include an indication of $N_{HE\text{-}LTF}$, $N_{antenna\text{-}config}$, and/or $N_{HE\text{-}LTF\text{-}new}$ (e.g., so that receiving STAs 115 may prepare to receive HE-LTFs in HE-LTF portion 770 accordingly).

Although the HE-LTFs 775 for each antenna array configuration are shown transmitted back-to-back, other configurations, arrangements, or patterns may be used to transmit the HE-LTFs 775. Also, multiple antenna array configurations may be used to transmit other types of training fields within the same preamble 725. STAs 115 that receive a preamble 725 with $N_{HE\text{-}LTF}>1$ may be able to determine channel characteristic information such as SNR information, power information, and/or channel estimation information.

An enhanced NDP such as enhanced NDP 705 may be sent after an announcement packet such as an enhanced NDPA. An enhanced NDPA may alert one or more STAs 115 that an enhanced NDP is going to be sent (e.g., that the next NDP is for enhanced antenna array training and will be configured so that the STAs 115 can provide channel characteristic feedback for multiple antenna array configurations). In some cases, the enhanced NDPA may indicate the upcoming enhanced NDPA by setting or clearing a bit. For example, one of the reserved bits of the enhanced NDPA may be used to indicate the upcoming enhanced NDP. Or the enhanced NDP may include an additional bit or field that includes the indication. In some cases, the enhanced NDPA may include a field indicating the type of channel characteristic information the AP 105 expects from the STA(s) 115 in response to the subsequent enhanced NDP. For example, the field may indicate or request that a STA's 115 response to the enhanced NDP includes signal power information, SNR information, channel estimation information, or a combination thereof. Thus, a STA 115 may determine what type of channel characteristic information to gather and transmit in response to an enhanced NDP.

A STA 115 that receives an enhanced NDPA from an AP 105 may prepare for and receive the subsequent enhanced NDP from AP 105. The STA 115 may determine channel characteristic information for each antenna array configuration used to transmit the HE-LTFs 775. The STA 115 may compress the channel characteristic information to form an enhanced CBF packet that may be transmitted back to AP 105. The AP 105 may then use the channel characteristic information for each antenna array configuration that is conveyed by enhanced CBF to determine which antenna array configuration to use, and in some cases to determine a corresponding beamforming steering matrix.

Figure 7B:
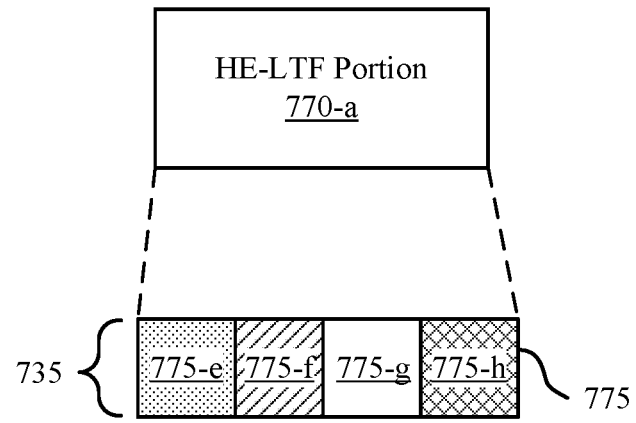
FIG. 7B illustrates an example of a high-efficiency long training field (HE-LTF) portion that supports enhanced antenna array training in accordance with aspects of the present disclosure.
Figure 7B:
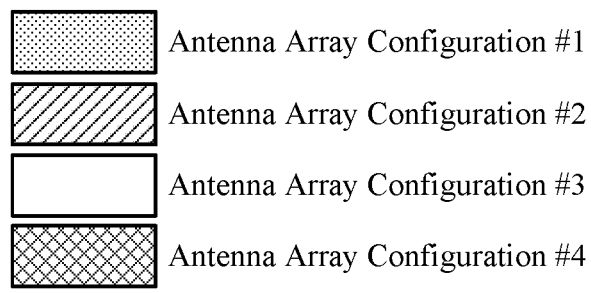

FIG. 7B shows an example of an HE-LTF portion 770-a for enhanced antenna array training in accordance with various aspects of the present disclosure. HE-LTF portion 770-a may be an example of an HE-LTF portion 770 of a preamble 725 as described with reference to FIG. 7A. In the example depicted in FIG. 7B, multiple antenna array configurations of an AP 105 are used to transmit HE-LTF portion 770-a, and each antenna array configuration transmits a single HE-LTF 775. For instance, a first antenna array configuration may is used to transmit HE-LTF 775-e, a second antenna array configuration is used to transmit HE-LTF 775-f, a third antenna array configuration is used to transmit HE-LTF 775-g, and a fourth antenna array configuration is used to transmit HE-LTF 775-h. Thus, $N_{HE\text{-}LTF}=1$, $N_{antenna\text{-}config}=4$, and $N_{HE\text{-}LTF\text{-}new}=4$ for HE-LTF portion 770-a. STAs 115 that receive a preamble with $N_{HE\text{-}LTF}=1$ may not be able to determine some types of channel characteristic information (e.g., channel estimation information), for example due to the lack of multiple HE-LTFs 775 sent using the same antenna array configuration. Thus, STAB 115 that receive a preamble with $N_{HE\text{-}LTF}=1$ may report back to the AP 105 channel information such as SNR information and power information.

Figure 8A:
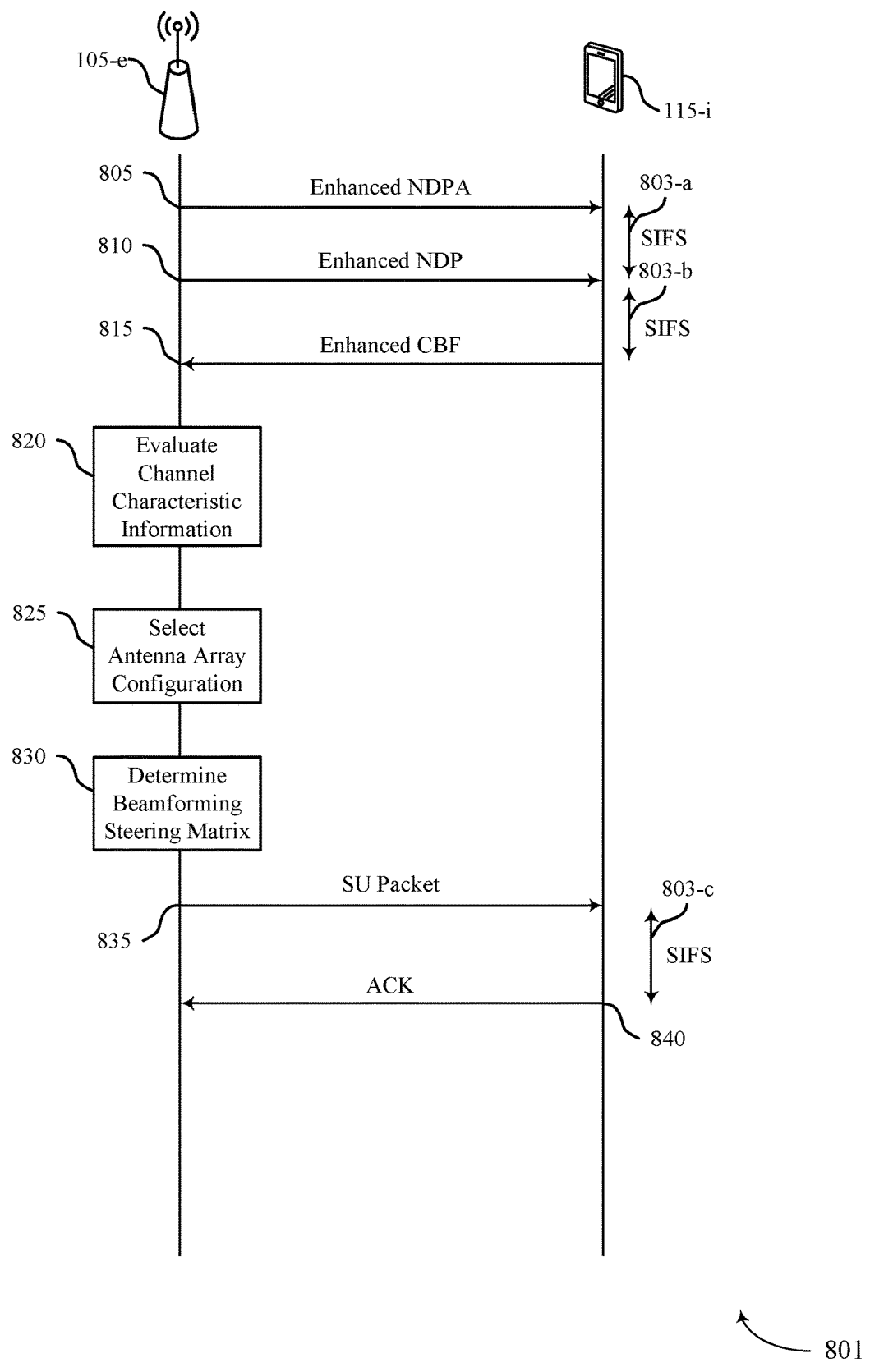
FIG. 8A illustrates an example of a process flow that supports enhanced antenna array training in accordance with aspects of the present disclosure.

FIG. 8A illustrates an example of a process flow 801 for enhanced antenna array training in accordance with various aspects of the present disclosure. Process flow 801 may include AP 105-e and STA 115-i which may be examples of the corresponding devices described with reference to FIG. 1-2. Process flow 801 may be an example of explicit antenna array training for SU-MIMO. AP 105-e may include an antenna array and may be capable of using different antenna array configurations of the antenna array. The antenna array may be connected to one or more transmit chains of AP 105-e. In some examples, all the elements of the antenna array may be connected to a transmit chain, and the AP 105-d may selectively control and switch the transmission from the elements for the transmit chain.

At 805, AP 105-e may transmit an enhanced NDPA to STA 115-i. The enhanced NDPA may include an indication that a subsequent, corresponding enhanced NDP is to be used for antenna array training and includes HE-LTFs that have been transmitted using different antenna array configurations. At 810, and after SIFS duration 803-a, AP 105-e may transmit an enhanced NDP to STA 115-i. The enhanced NDP may include a preamble with a number of HE-LTFs that are transmitted using different antenna array configurations (e.g., $N_{antenna\text{-}config}>1$). In some cases, each antenna array configuration may be used to transmit multiple HE-LTFs within the enhanced NDP (e.g., $N_{HE\text{-}LTF}>1$). At 815, and after SIFS duration 803-b, STA 115-i may transmit, and AP 105-e may receive, an enhanced CBF. The enhanced CBF may include channel characteristic information (e.g., channel estimation information, SNR information, and/or power information) for each of the antenna array configurations used to transmit the HE-LTFs in the enhanced NDP.

At 820, AP 105-e may evaluate the received channel characteristic information for each of the antenna array configurations. AP 105-e may, at 825, select an antenna array configuration based on the channel characteristic information for each antenna array configuration. For example AP 105-e may select the antenna array configuration with the highest SNR or the highest power. At 830, AP 105-e may determine (e.g., calculate) a beamforming steering matrix for the selected antenna array configuration using channel estimation information conveyed by the enhanced CBF. Accordingly, at 835, AP 105-e may use the selected antenna array configuration for the antenna array to transmit a SU packet that is beamformed using the beamforming steering matrix for the selected antenna array configuration. STA 115-i may, at 840 and after SIFS duration 803-c, send an ACK packet to AP 105-e in response to the received SU packet.

Figure 8B:
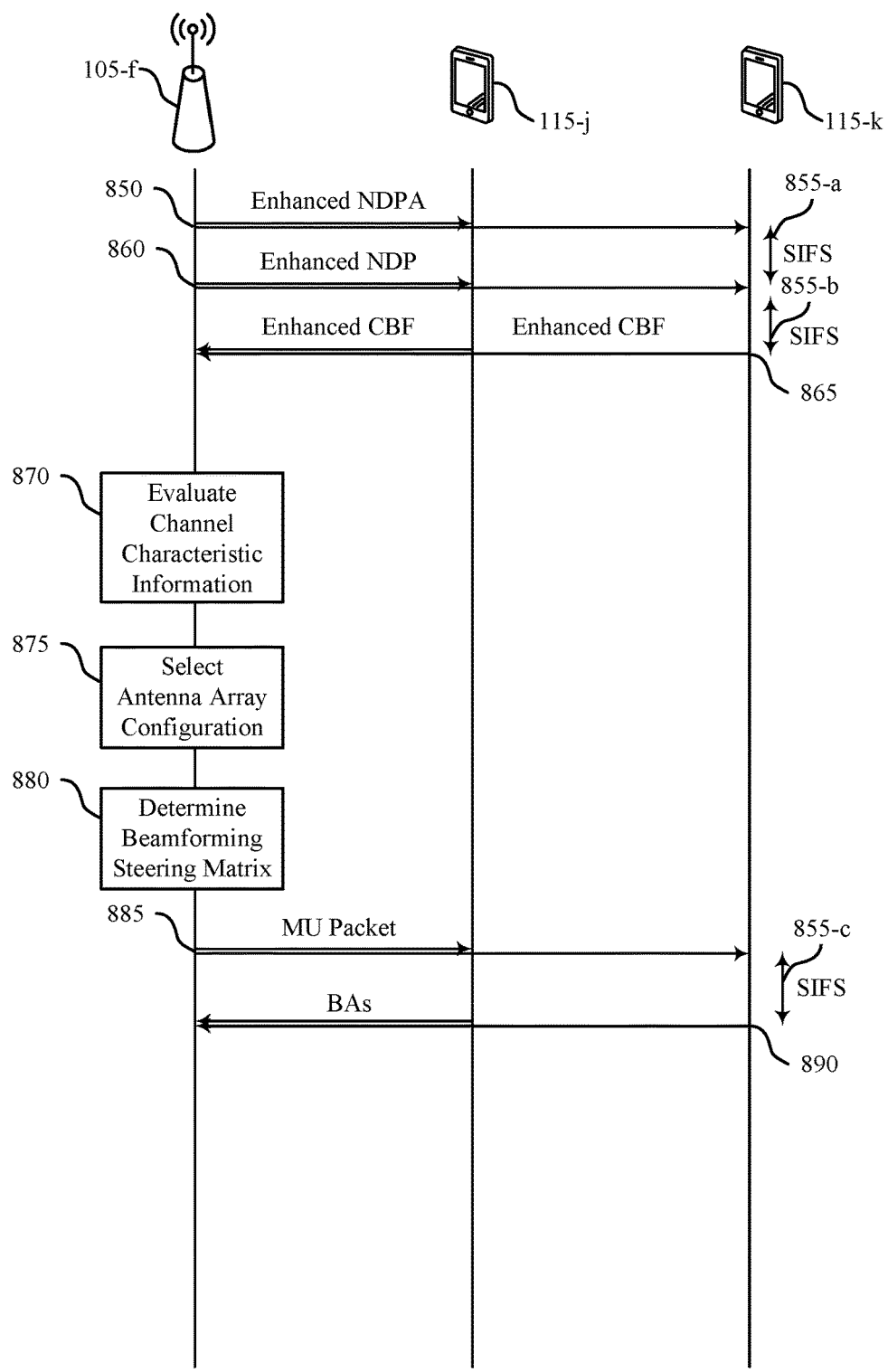
FIG. 8B illustrates an example of a process flow that supports enhanced antenna array training in accordance with aspects of the present disclosure.

FIG. 8B illustrates an example of a process flow 802 for enhanced antenna array training in accordance with various aspects of the present disclosure. Process flow 802 may include AP 105-f, STA 115-j, and STA 115-k which may be examples of the corresponding devices described with reference to FIG. 1-2. Process flow 802 may be an example of explicit antenna array training for MU-MIMO. AP 105-f may include an antenna array and may be capable of using different antenna array configurations of the antenna array. The antenna array may be connected to one or more transmit chains of AP 105-f. In some examples, all the elements of the antenna array may be connected to a transmit chain, and the AP 105-*d* may selectively control and switch the transmission from the elements for the transmit chain.

At 850, AP 105-*f* may transmit an enhanced NDPA to STA 115-*j* and STA 115-*k*. The enhanced NDPA may include an indication that a subsequent, corresponding enhanced NDP includes HE-LTFs that have been transmitted using different antenna array configurations. At 860, and after SIFS duration 855-*a*, AP 105-*f* may transmit an enhanced NDP to STA 115-*j* and STA 115-*k*. The enhanced NDP may include preamble with a number of HE-LTFs that are transmitted using different antenna array configurations, and each antenna array configuration may be used transmit multiple HE-LTFs within the enhanced NDP, as further described above. At 865, and after SIFS duration 855-*b*, STA 115-*j* and STA 115-*k* may transmit, and AP 105-*f* may receive, enhanced CBFs. The enhanced CBFs may include channel characteristic information (e.g., channel estimation information, SNR information, and/or power information) for each of the antenna array configurations used to transmit the HE-LTFs in the enhanced NDP.

At 870, AP 105-*f* may evaluate the received channel characteristic information for each of the antenna array configurations. AP 105-*f* may, at 875, select an antenna array configuration based on the channel characteristic information for each antenna array configuration. For example AP 105-*f* may select the antenna array configuration with the highest SNR or power. At 880, AP 105-*f* may determine (e.g., calculate) a beamforming steering matrix for the selected antenna array configuration using channel estimation information conveyed by the enhanced CBFs. Accordingly, at 885, AP 105-*f* may use the selected antenna array to transmit a MU packet that is beamformed using the beamforming steering matrix for the selected antenna array configuration. STA 115-*j* and STA 115-*k* may, at 890 and after SIFS duration 855-*c*, send an ACK packet to AP 105-*f* in response to the received MU packet.

Figure 9:
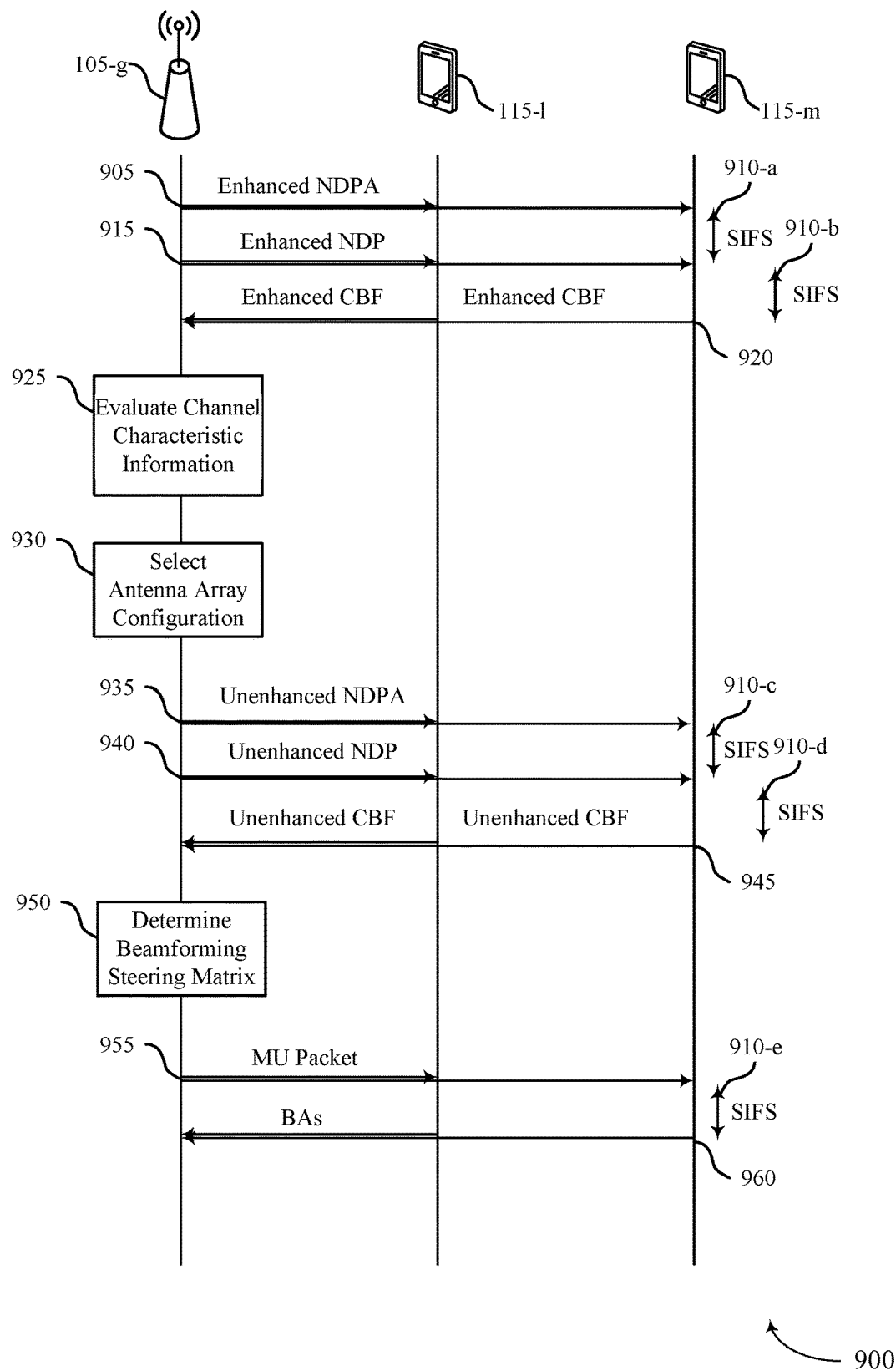
FIG. 9 illustrates an example of a process flow that supports enhanced antenna array training in accordance with aspects of the present disclosure.

FIG. 9 illustrates an example of a process flow 900 for enhanced antenna array training. In some cases, process flow 900 may represent aspects of techniques performed by an AP 105 and a STA 115 as described with reference to FIGS. 1-2. For example, process flow 900 may be an example of explicit antenna array training for MU-MIMO. A process similar to process flow 900 may be implemented for explicit antenna array training for SU-MIMO (e.g., by ignoring aspects of process flow 900 directed to STA 115-*m* and modifying aspects of process flow 900 directed to STA 115-1 such that SU packets are transmitted and/or received). AP 105-*g* may include an antenna array and may be capable of using different antenna array configurations of the antenna array.

At 905, AP 105-*g* may transmit an enhanced NDPA to STA 115-1 and STA 115-*m*. The enhanced NDPA may include an indication that a subsequent, corresponding enhanced NDP includes HE-LTFs that have been transmitted using different antenna array configurations. At 915, and after SIFS duration 910-*a*, AP 105-*g* may transmit an enhanced NDP to STA 115-1 and STA 115-*m*. The enhanced NDP may include preamble with a number HE-LTFs, where each HE-LTF is transmitted using a different antenna array configuration (e.g., where $N_{antenna-config} > 1$ and $N_{HE-LTF} = 1$). At 920, and after SIFS duration 910-*b*, STA 115-1 and STA 115-*m* may transmit, and AP 105-*g* may receive, enhanced CBFs. The enhanced CBFs may include channel characteristic information (e.g., SNR information and/or power information) for each of the antenna arrays used to transmit the HE-LTFs. Because $N_{HE-LTF} = 1$, the enhanced CBFs may not include channel estimation information. At 925, AP 105-*g* may evaluate the received channel characteristic information for each of the antenna array configurations. AP 105-*g* may, at 930, select an antenna array configuration based on the channel characteristic information for each antenna array configuration. For example, AP 105-*g* may select the antenna array configuration with the highest SNR or power.

At 935, AP 105-*g* may send an unenhanced NDPA to STA 115-1 and STA 115-*m*. The unenhanced NDPA may indicate that the next NDP is an unenhanced NDP that includes HE-LTFs that are transmitted by a single antenna array configuration, for example the antenna array configuration selected by AP 105-*g* at 930. At 940, and after SIFS duration 910-*c*, AP 105-*g* may transmit an unenhanced NDP to STA 115-1 and STA 115-*m*. At 945, and after SIFS duration 910-*d*, STA 115-1 and STA 115-*m* may send unenhanced CBFs to AP 105-*g*. The unenhanced CBFs may include channel estimation information for the antenna array configuration used to transmit the unenhanced NDP. At 950, AP 105-*g* may determine a beamforming steering matrix for the antenna array configuration using the channel estimation information conveyed by the unenhanced CBFs at 945. At 955, AP 105-*g* may transmit, using the selected antenna array configuration, a MU packet to STA 115-1 and STA 115-*m* according to the beamforming steering matrix. After SIFS duration 910-*e*, and at 960, STA 115-1 and STA 115-*m* may send BAs to AP 105-*g* in response to reception of the MU packet.

Figure 10:
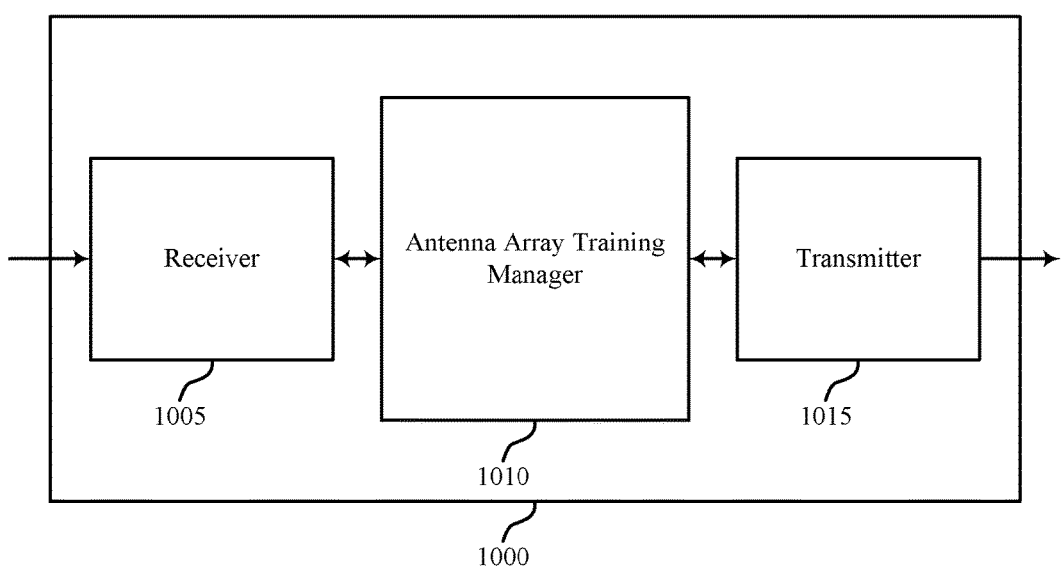
FIGS. 10 through 12 show block diagrams of a wireless device that supports enhanced antenna array training in accordance with aspects of the present disclosure.

FIG. 10 shows a block diagram of a wireless device 1000 that supports enhanced antenna array training in accordance with various aspects of the present disclosure. Wireless device 1000 may be an example of aspects of an AP 105 described with reference to FIGS. 1, 2, 5A, 5B, 6, 8A, 8B, and 9. Wireless device 1000 may include receiver 1005, transmitter 1015 and antenna array training manager 1010. Wireless device 1000 may also include one or more processors, memory coupled with the one or more processors, and instructions stored in the memory that are executable by the one or more processors to enable the one or more processors to perform one or more of the enhanced antenna array training features discussed herein. Each of these components may be in communication with each other.

The receiver 1005 may receive information such as packets, user data, or control information associated with various information channels (e.g., control channels, data channels, and information related to enhanced antenna array training, etc.). For example, receiver 1005 may receive one or more SU packets, MU packets, data packets, CBF packets, ACK packets, or BAs. Information may be passed on to other components of the device. The receiver 1005 may be an example of aspects of the transceiver 1325 described with reference to FIG. 13.

The transmitter 1015 may transmit signals received from other components of wireless device 1000. For example, the transmitter 1015 may transmit enhanced NDPAs, enhanced NDPs, unenhanced NDPA, unenhanced NDPs, and beamformed SU or MU packets. In some examples, the transmitter 1015 may be collocated with a receiver in a transceiver module. For example, the transmitter 1015 may be an example of aspects of the transceiver 1325 described with reference to FIG. 13.

The receiver 1005 and/or transmitter 1015 may include a plurality of antennas and/or antenna elements arranged as an antenna array capable of multiple antenna array configurations during operation.

The antenna array training manager 1010 may identify a set of antenna array configurations of the antenna array. The antenna array training manager 1010 may facilitate switching between the antenna array configurations during the reception or transmission of a packet. In some cases, the antenna array training manager may coordinate with the transmitter 1015 to transmit a WLAN preamble including a set of training fields (e.g., HE-LTFs). The set of training fields may be transmitted using the identified set of antenna array configurations. In another example, the antenna array training manager 1010 may switch between the set of antenna array configurations during reception of a first WLAN packet. The antenna array training manager 1010 may determine channel characteristic information associated with the set of antenna array configurations based on the reception of the first WLAN packet, and transmit a second WLAN packet using an antenna array configuration selected from the set of antenna array configurations based on the determined channel characteristic information. The antenna array training manager 1010 may also be an example of aspects of the antenna array training manager 1010-c described with reference to FIG. 13.

In some cases, the antenna array training manager 1010 may be a processor or a portion of a processor (e.g., a transceiver processor, or a radio processor, or a receiver processor). The processor may be coupled with memory and execute instructions stored in the memory that enable the processor to perform or facilitate the antenna array training features discussed herein. A transceiver processor may be collocated with and/or communicate with (e.g., direct the operations of) a transceiver of the wireless device 1000. A radio processor may be collocated with and/or communicate with (e.g., direct the operations of) a radio (e.g., a Wi-Fi radio) of the wireless device 1000. A receiver processor may be collocated with and/or communicate with (e.g., direct the operations of) a receiver (e.g., receiver 1005) of the wireless device 1000.

Figure 11:
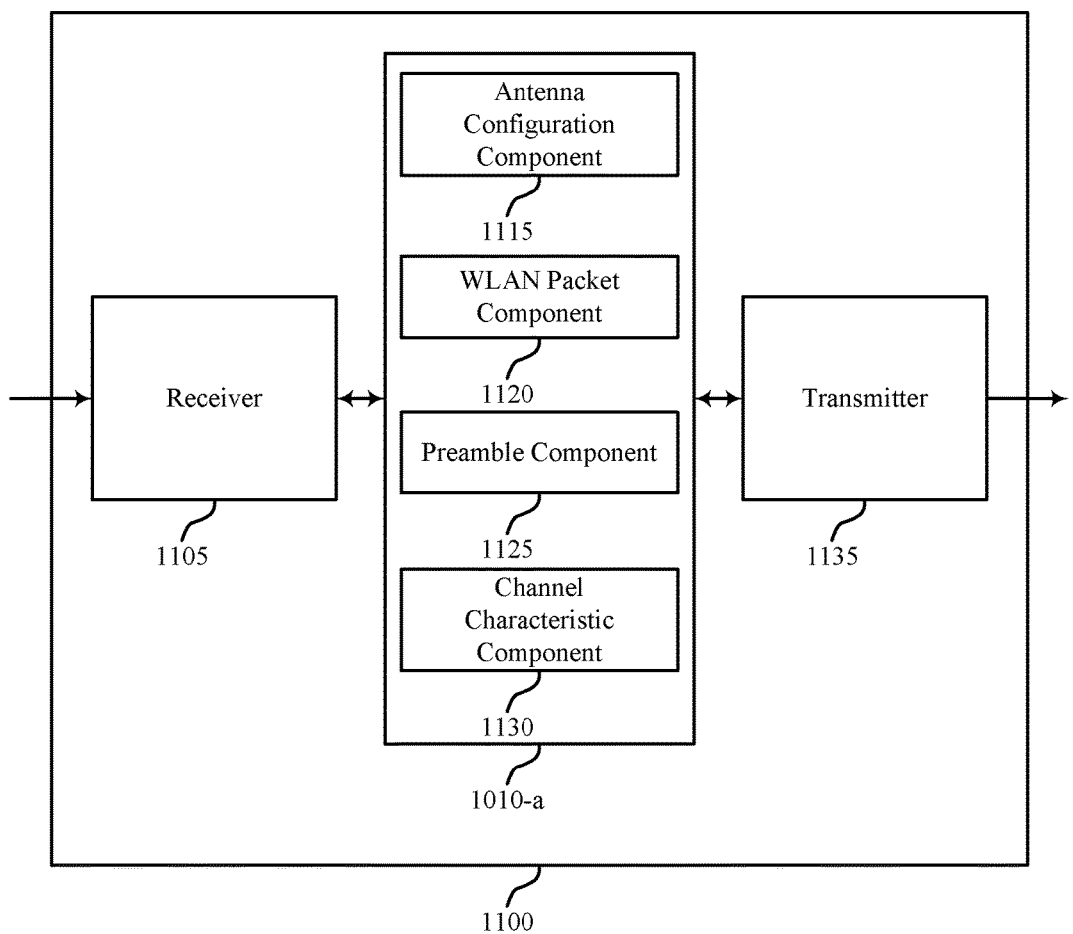

FIG. 11 shows a block diagram of a wireless device 1100 that supports enhanced antenna array training in accordance with various aspects of the present disclosure. Wireless device 1100 may be an example of aspects of a wireless device 1000 or an AP 105 described with reference to FIGS. 1, 2, 5A, 5B, 6, and 8A-10. Wireless device 1100 may include receiver 1105, antenna array training manager 1010-a and transmitter 1135. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13. The transmitter 1135 may transmit signals received from other components of wireless device 1100. In some examples, the transmitter 1135 may be collocated with a receiver in a transceiver module. For example, the transmitter 1135 may be an example of aspects of the transceiver 1325 described with reference to FIG. 13. The transmitter 1135 may utilize a single antenna, or it may utilize a plurality of antennas (e.g., various antenna array configurations in an antenna array).

The antenna array training manager 1010-a may be an example of aspects of antenna array training manager 1010 described with reference to FIG. 10. The antenna array training manager 1010-a may include antenna configuration component 1115, channel characteristic component 1130, WLAN packet component 1120 and preamble component 1125. The antenna array training manager 1010-a may be an example of aspects of the antenna array training manager 1010-c described with reference to FIG. 13.

The antenna configuration component 1115 may identify a set of antenna array configurations within an antenna array. The antenna array configurations may be selected for switching during reception or transmission of a packet (e.g., the antenna configuration component 1115 may switch between a set of antenna array configurations during reception of a first WLAN packet, or use a set of antenna array configurations to transmit training fields of a preamble). The antenna configuration component 1115 may select an antenna array configuration of the set of antenna array configurations based on channel characteristic information.

The antenna configuration component 1115 may also determine which portion(s) of a packet to switch antenna array configurations during reception of the packet. For example, the antenna configuration component 1115 may determine a portion of a packet to switch antenna array configurations based on the number of antenna array configurations in the set of antenna array configurations and based on the length of the extension portion of the packet. In some cases (e.g., when the first packet is a MU packet from a first STA 115), antenna configuration component 1115 may switch between the set of antenna array configurations during reception of another WLAN MU packet from a second STA 115.

In some cases, switching antenna array configurations includes switching between the set of antenna array configurations during the data portion of the packet. In some cases, switching includes switching between the set of antenna array configurations during an extension portion of the packet, where the extension portion of the packet is appended to the packet after a data portion of the packet. In some cases, the antenna configuration component 1115 may be a processor or a portion of a processor. The processor may be coupled with memory and execute instructions stored in the memory that enable the processor to perform or facilitate the antenna array configuration switching features discussed herein.

The channel characteristic component 1130 may receive channel characteristic information corresponding to the set of antenna array configurations. The channel characteristic information may be based on training fields sent by different antenna array configurations during a preamble. The channel characteristic component 1130 may determine channel characteristic information associated with the set of antenna array configurations based on the reception of a WLAN packet when the WLAN packet is received using multiple antenna array configurations. In some cases, the channel characteristic information is at least one of a signal power, or a SNR, and/or a channel estimation information. In some cases, the channel characteristic component 1130 may be a processor or a portion of a processor (e.g., a transceiver processor, or a radio processor, or a receiver processor). The processor may be coupled with memory and execute instructions stored in the memory that enable the processor to perform or facilitate the channel characteristic determination features discussed herein.

The WLAN packet component 1120 may receive SU or MU WLAN packets (e.g., data packets or ACK packets) with multiple antenna array configurations, and/or a WLAN packets using a selected antenna array configuration. The WLAN packet component 1120 may transmit WLAN packets using an antenna array configuration selected from the set of antenna array configurations based on the determined channel characteristic information. In some cases, the WLAN packet component 1120 may be a processor or a portion of a processor (e.g., a transceiver processor, or a radio processor, or a receiver processor). The processor may be coupled with memory and execute instructions stored in the memory that enable the processor to perform or facilitate the WLAN packet transmission and reception features discussed herein.

The preamble component 1125 may transmit a WLAN preamble including a set of training fields that are transmitted a number of antenna array configurations identified by the antenna configuration component 1115. In some cases, the WLAN preamble is included in an NDP. In some cases, the WLAN preamble is a multi-user preamble or a single-user preamble. The preamble component 1125 may transmit a second WLAN preamble that includes multiple training fields that are transmitted using a selected antenna array configuration. In some cases, the WLAN preamble includes a signal field that indicates a number of antenna array configurations of the set of antenna array configurations, a number of training fields of the set of training fields, and/or a number of training fields transmitted per antenna array configuration. In some cases, the preamble component 1125 may be a processor or a portion of a processor (e.g., a transceiver processor or a radio processor). The processor may be coupled with memory and execute instructions stored in the memory that enable the processor to perform or facilitate the preamble transmission features discussed herein.

Figure 12:
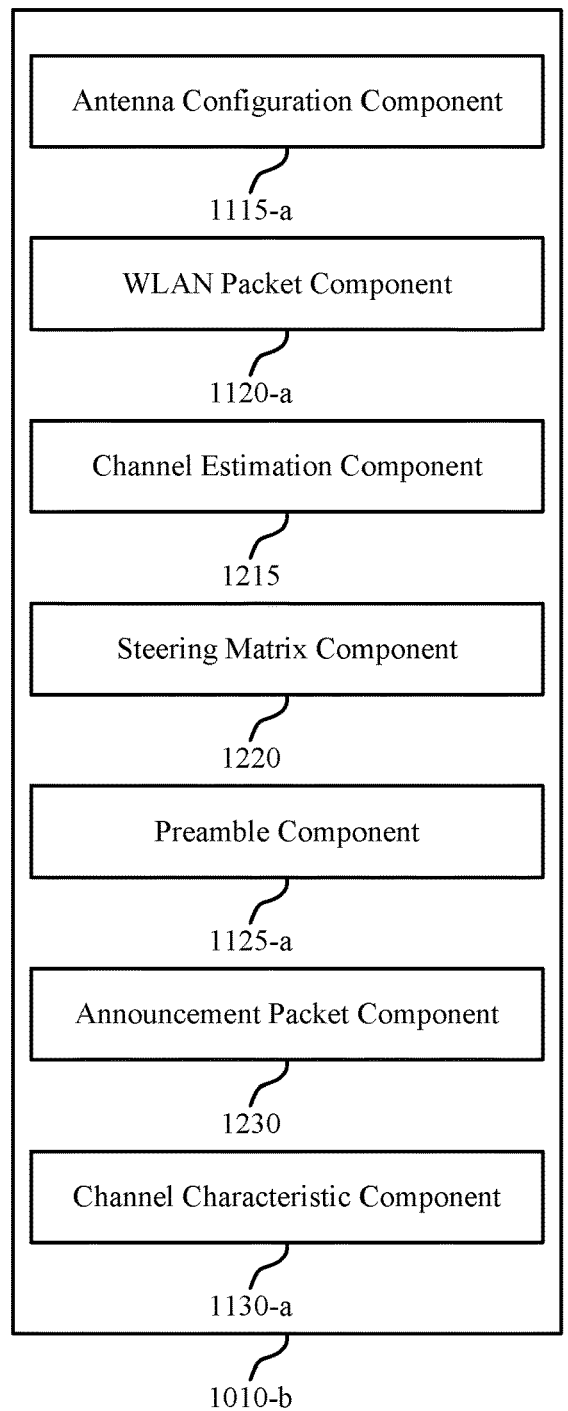

FIG. 12 shows a block diagram of an antenna array training manager 1010-b which may be an example of the corresponding component of wireless device 1000 or wireless device 1100. That is, antenna array training manager 1010-b may be an example of aspects of antenna array training manager 1010-a or antenna array training manager 1010-a described with reference to FIGS. 10 and 11. The antenna array training manager 1010-b may also be an example of aspects of the antenna array training manager 1010-c described with reference to FIG. 13.

The antenna array training manager 1010-b may include antenna configuration component 1115-a, WLAN packet component 1120-a, channel estimation component 1215, steering matrix component 1220, preamble component 1125-a, announcement packet component 1230 and channel characteristic component 1130-a. Each of these modules may communicate, directly or indirectly, with one another (e.g., via one or more buses). The antenna configuration component 1115-a, WLAN packet component 1120-a, preamble component 1125-a, and channel characteristic component 1130-a may perform aspects of the techniques described with reference to their respective counterparts as described in FIG. 11.

The channel estimation component 1215 may estimate a channel over which a WLAN packet is conveyed. In some cases, the channel estimation component 1215 may receive channel estimation information that the channel estimation component 1215 uses to estimate the channel. The channel estimation information may be received in response to an enhanced or unenhanced WLAN preamble, and may include channel estimation information for one or more antenna array configurations. In some cases, the channel estimation component 1215 may be a processor or a portion of a processor (e.g., a transceiver processor, or a radio processor, or a receiver processor). The processor may be coupled with memory and execute instructions stored in the memory that enable the processor to perform or facilitate the channel estimation features discussed herein.

The steering matrix component 1220 may calculate a beamforming steering matrix based at least part on a selected antenna array configuration and the channel characteristic information (e.g., channel estimation information). WLAN packets may be beamformed according to the beamforming steering matrix. In some cases, the steering matrix component 1220 may be a processor or a portion of a processor. The processor may be coupled with memory and execute instructions stored in the memory that enable the processor to perform or facilitate the beamforming steering matrix determination features discussed herein.

The announcement packet component 1230 may transmit, prior to transmission of a WLAN preamble, an announcement packet including an indication that the WLAN preamble will include a set of training fields transmitted using different antenna array configurations. The announcement packet component 1230 may transmit unenhanced NDPAs and/or enhanced NDPAs. In some cases, the announcement packet component 1230 may be a processor or a portion of a processor (e.g., a transceiver processor, or a radio processor, or a receiver processor). The processor may be coupled with memory and execute instructions stored in the memory that enable the processor to perform or facilitate the NDPA features discussed herein.

Figure 13:
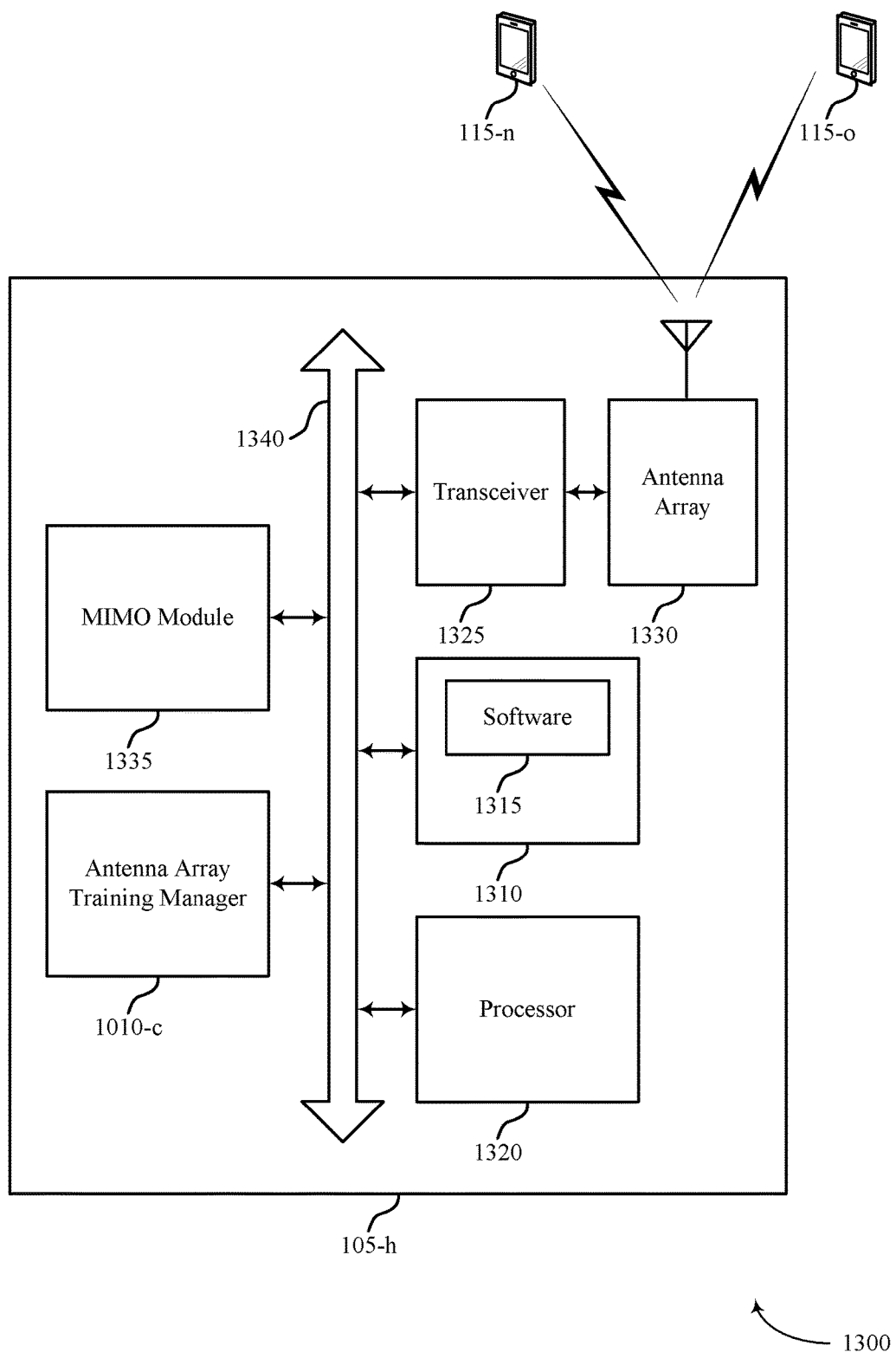
FIG. 13 illustrates a block diagram of a system including an AP that supports enhanced antenna array training in accordance with aspects of the present disclosure.

FIG. 13 shows a diagram of a system 1300 including a device that supports enhanced antenna array training in accordance with various aspects of the present disclosure. For example, system 1300 may include AP 105-h, which may be an example of a wireless device 1000, a wireless device 1100, or an AP 105 as described with reference to FIGS. 1, 2, 5A, 5B, 6, and 8A-11. AP 105-h may include antenna array training manager 1010-c, memory 1310, processor 1320, transceiver 1325, antenna array 1330 and MIMO module 1335. Each of these modules may communicate, directly or indirectly, with one another (e.g., via one or more buses 1340). The antenna array training manager 1010-c may be an example of an antenna array training manager as described with reference to FIGS. 8-10.

The memory 1310 may include random access memory (RAM) and read only memory (ROM). The memory 1310 may store computer-readable, computer-executable software including instructions that, when executed, cause the processor to perform various functions described herein (e.g., enhanced antenna array training, etc.). In some cases, the software 1315 may not be directly executable by the processor but may cause a computer (e.g., when compiled and executed) to perform functions described herein. The processor 1320 may include an intelligent hardware device, (e.g., a central processing unit (CPU), a microcontroller, an application specific integrated circuit (ASIC), etc.).

The transceiver 1325 may communicate bi-directionally, via one or more antennas, wired, or wireless links, with one or more networks, as described above. For example, the transceiver 1325 may communicate bi-directionally with an AP 105 or a STA 115. The transceiver 1325 may also include a modem to modulate the packets and provide the modulated packets to the antennas of antenna array 1330 for transmission, and to demodulate packets received from the antennas of antenna array 1330. The antenna array 1330 may include multiple antennas and/or antenna elements and may be capable of multiple antenna array configurations. The antenna array 1330 may be capable of concurrently transmitting or receiving multiple wireless transmissions. MIMO module 1335 may enable the AP 105-h to collaboratively communicate with multiple STAs 115 through, for example, MIMO, CoMP, or other schemes. MIMO techniques use multiple antennas of antenna array 1330 on AP 105-h and/or multiple antennas on STA 115-n or STA 115-o to take advantage of multipath environments to transmit multiple data streams.

Figure 14:
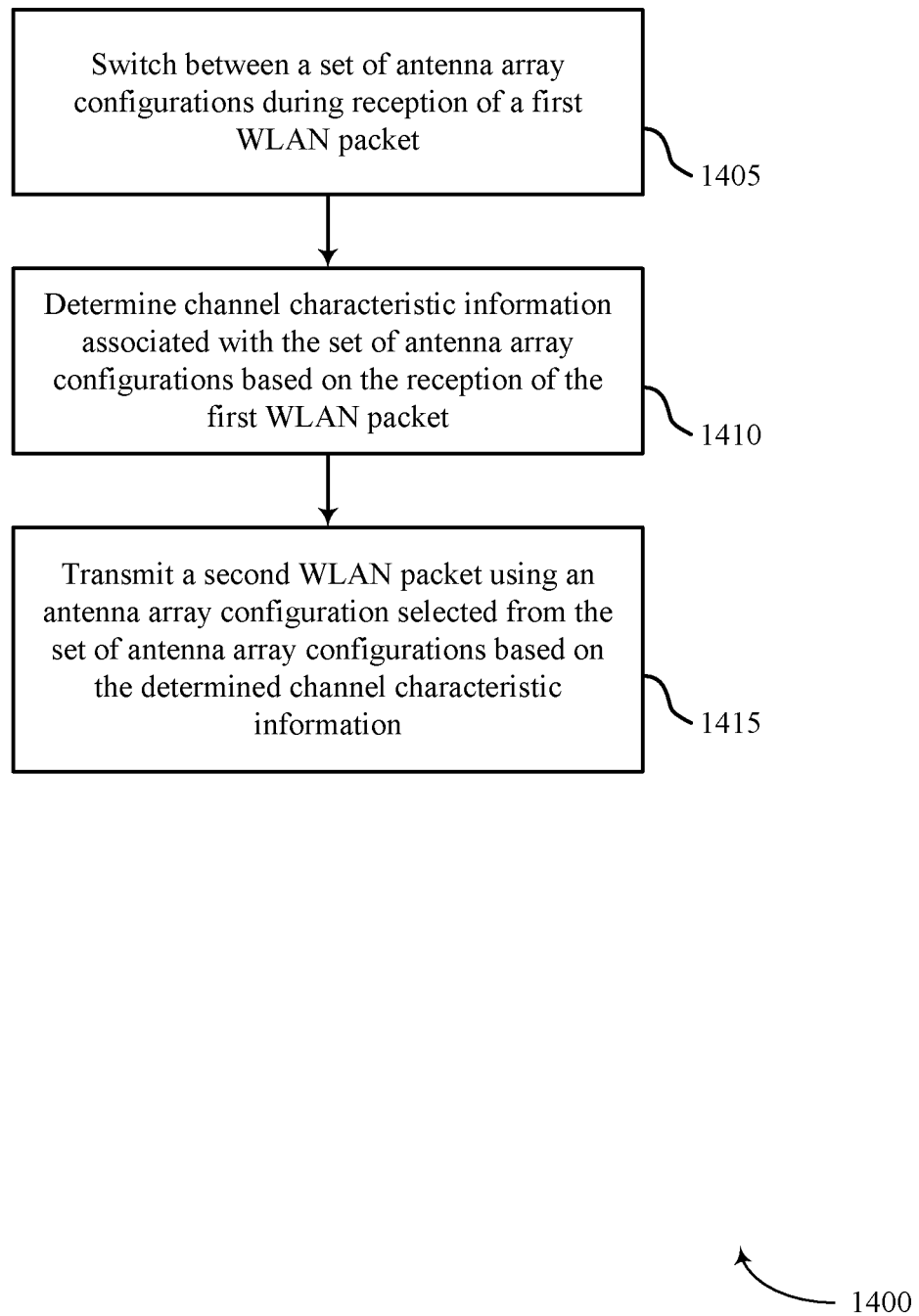
FIGS. 14 through 15 illustrate methods for enhanced antenna array training in accordance with aspects of the present disclosure.

FIG. 14 shows a flowchart illustrating a method 1400 for enhanced antenna array training in accordance with various aspects of the present disclosure. The operations of method 1400 may be implemented by a device such as an AP 105 or its components as described with reference to FIGS. 1, 2, 5A, 5B, 6, and 8A-11. In some examples, the AP 105 may execute a set of codes to control the functional elements of the device to perform the functions described below. Additionally or alternatively, the AP 105 may perform aspects the functions described below using special-purpose hardware.

At block 1405, the method may include switching between a set of antenna array configurations during reception of a first WLAN packet as described above with reference to FIGS. 2-9. In certain examples, the operations of block 1405 may be performed by the antenna configuration component as described with reference to FIG. 11. At block 1410, the method may include determining channel characteristic information associated with the set of antenna array configurations based on the reception of the first WLAN packet as described above with reference to FIGS. 2-9. In certain examples, the operations of block 1410 may be performed by the channel characteristic component as described with reference to FIG. 11. At block 1415, the AP 105 may transmit a second WLAN packet using an antenna array configuration selected from the set of antenna array configurations based on the determined channel characteristic information as described above with reference to FIGS. 2-9. In certain examples, the operations of block 1415 may be performed by the WLAN packet component as described with reference to FIG. 11.

Figure 15:
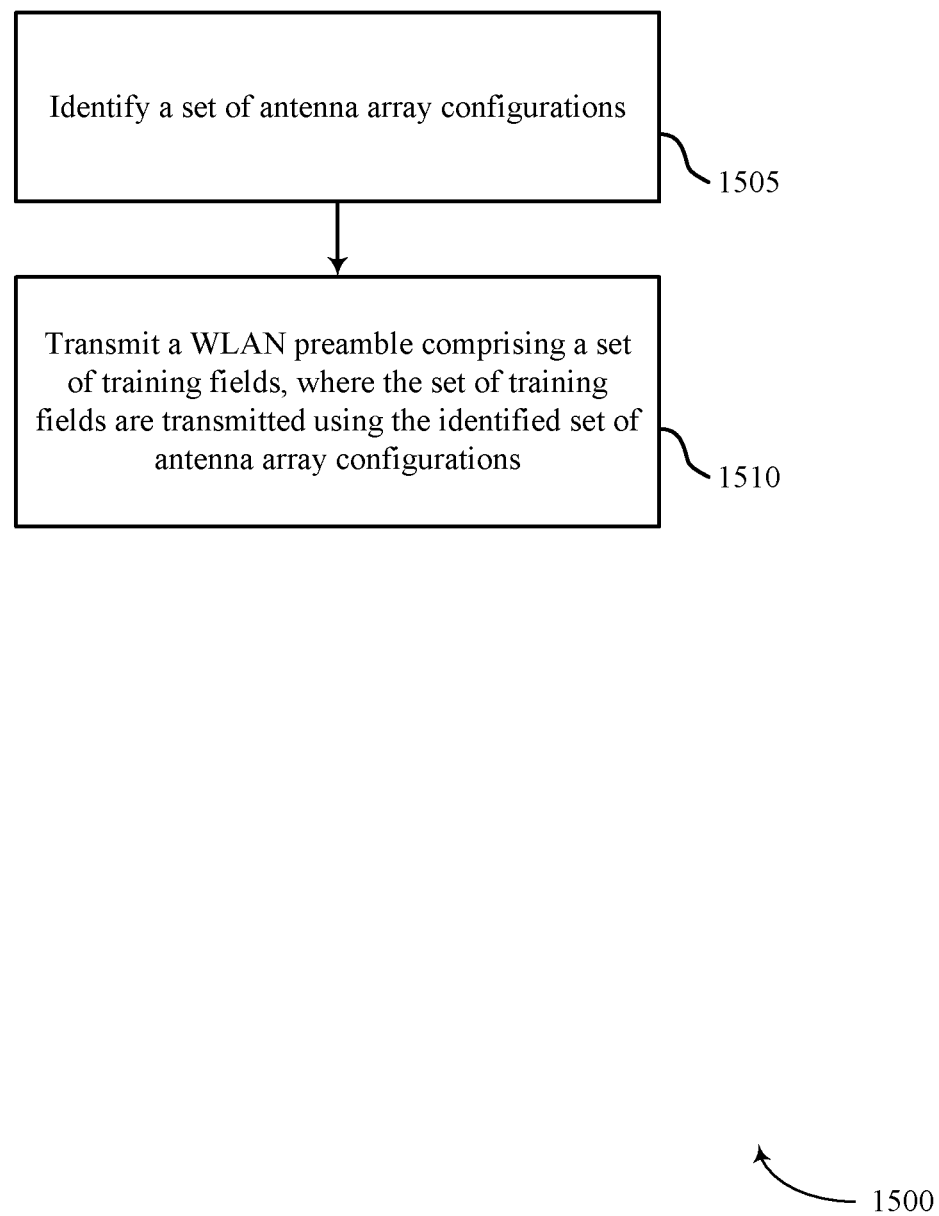

FIG. 15 shows a flowchart illustrating a method 1500 for enhanced antenna array training in accordance with various aspects of the present disclosure. The operations of method 1500 may be implemented by a device such as an AP 105 or its components as described with reference to FIGS. 1, 2, 5A, 5B, 6, and 8A-11. In some examples, the AP 105 may execute a set of codes to control the functional elements of the device to perform the functions described below. Additionally or alternatively, the AP 105 may perform aspects the functions described below using special-purpose hardware.

At block 1505, the method may include identifying a set of antenna array configurations as described above with reference to FIGS. 2-9. In certain examples, the operations of block 1505 may be performed by the antenna configuration component as described with reference to FIG. 11. At block 1510, the method may include transmitting a WLAN preamble including a set of training fields, where the set of training fields are transmitted using the identified set of antenna array configurations as described above with reference to FIGS. 2-9. In certain examples, the operations of block 1510 may be performed by the preamble component as described with reference to FIG. 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for enhanced antenna array training.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Thus, aspects of the disclosure may provide for enhanced antenna array training. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. An apparatus for wireless communication, comprising:
a memory that stores instructions; and
a processor coupled with the memory, wherein the processor and the memory are configured to:
switch between a plurality of antenna array configurations during reception of a data portion, or an extension portion, or a combination thereof, of a first wireless local area network (WLAN) packet;
determine channel characteristic information associated with the plurality of antenna array configurations based at least in part on the reception of the first WLAN packet;
transmit a second WLAN packet using an antenna array configuration selected from the plurality of antenna array configurations based at least in part on the determined channel characteristic information; and
wherein the processor and memory are further configured to:
determine a portion of the first WLAN packet to switch antenna array configurations based at least in part on a number of antenna array configurations of the plurality of antenna array configurations and a length of the extension portion of the first WLAN packet.

2. The apparatus of claim 1, wherein the processor and memory are further configured to:
calculate a beamforming steering matrix based at least part on the selected antenna array configuration and the determined channel characteristic information, wherein the second WLAN packet is beamformed according to the beamforming steering matrix.

3. The apparatus of claim 1,
wherein the extension portion of the first WLAN packet is appended to the first WLAN packet after the data portion of the first WLAN packet.

4. The apparatus of claim 3, wherein the channel characteristic information comprises signal power of the first WLAN packet, and wherein the processor and memory are further configured to:
receive a third WLAN packet with the selected antenna array configuration;
estimate a channel over which the third WLAN packet was conveyed; and
calculate a beamforming steering matrix based at least part on the selected antenna array configuration and the channel estimation, wherein the second WLAN packet is beamformed according to the beamforming steering matrix.

5. The apparatus of claim 1, wherein the first WLAN packet comprises a data packet, or an acknowledgement (ACK) packet, or a probe request packet, or an association request packet, or a channel reservation response packet, or a combination thereof.

6. The apparatus of claim 1, wherein the first WLAN packet is a single-user (SU) WLAN packet.

7. The apparatus of claim 1, wherein the first WLAN packet is a first multi-user (MU) transmission from a first station.

8. The apparatus of claim 7, wherein the processor and memory are further configured to:
switch between the plurality of antenna array configurations during reception of a third WLAN packet that is a second MU transmission from a second station, wherein the channel characteristic information for the plurality of antenna array configurations is determined based at least in part on the reception of the first WLAN packet and the reception of the third WLAN packet.

9. The apparatus of claim 1, wherein the channel characteristic information is at least one of a signal power, or a signal-to-noise ratio (SNR), or a channel estimation, or a combination thereof.

10. A method of wireless communication comprising:
switching between a plurality of antenna array configurations during reception of a data portion, or an extension portion, or a combination thereof, of a first wireless local area network (WLAN) packet;
determining channel characteristic information associated with the plurality of antenna array configurations based at least in part on the reception of the first WLAN packet;
transmitting a second WLAN packet using an antenna array configuration selected from the plurality of antenna array configurations based at least in part on the determined channel characteristic information; and
determining a portion of the first WLAN packet to switch antenna array configurations based at least in part on a number of antenna array configurations of the plurality of antenna array configurations and a length of the extension portion of the first WLAN packet.

11. The method of claim 10, further comprising:
calculating a beamforming steering matrix based at least part on the selected antenna array configuration and the determined channel characteristic information, wherein the second WLAN packet is beamformed according to the beamforming steering matrix.

12. The method of claim 10,
wherein the extension portion of the first WLAN packet is appended to the first WLAN packet after the data portion of the first WLAN packet.

13. The method of claim 12, wherein the channel characteristic information comprises signal power of the first WLAN packet, further comprising:
receiving a third WLAN packet with the selected antenna array configuration;
estimating a channel over which the third WLAN packet was conveyed; and
calculating a beamforming steering matrix based at least part on the selected antenna array configuration and the channel estimation, wherein the second WLAN packet is beamformed according to the beamforming steering matrix.

14. The method of claim 10, wherein the first WLAN packet is a single-user (SU) WLAN packet.

15. The method of claim 10, wherein the first WLAN packet is a first multi-user (MU) transmission from a first station.

16. The method of claim 15, further comprising:
switching between the plurality of antenna array configurations during reception of a third WLAN packet that is a second MU transmission from a second station, wherein the channel characteristic information for the plurality of antenna array configurations is determined based at least in part on the reception of the first WLAN packet and the reception of the third WLAN packet.

17. An apparatus for wireless communication comprising:
means for switching between a plurality of antenna array configurations during reception of a data portion, or an extension portion, or a combination thereof, of a first wireless local area network (WLAN) packet;
means for determining channel characteristic information associated with the plurality of antenna array configurations based at least in part on the reception of the first WLAN packet, wherein the first WLAN packet is a first multi-user (MU) transmission from a first station;
means for transmitting a second WLAN packet using an antenna array configuration selected from the plurality of antenna array configurations based at least in part on the determined channel characteristic information; and
means for switching between the plurality of antenna array configurations during reception of a third WLAN packet that is a second MU transmission from a second station, wherein the channel characteristic information for the plurality of antenna array configurations is determined based at least in part on the reception of the first WLAN packet and the reception of the third WLAN packet.

18. The apparatus of claim 17, further comprising:
means for calculating a beamforming steering matrix based at least part on the selected antenna array configuration and the determined channel characteristic information, wherein the second WLAN packet is beamformed according to the beamforming steering matrix.

19. The apparatus of claim 17,
wherein the extension portion of the first WLAN packet is appended to the first WLAN packet after a data portion of the first WLAN packet.

20. The apparatus of claim 19, wherein the channel characteristic information comprises signal power of the first WLAN packet, and further comprising:
means for receiving a third WLAN packet with the selected antenna array configuration;
means for estimating a channel over which the third WLAN packet was conveyed; and
means for calculating a beamforming steering matrix based at least part on the selected antenna array configuration and the channel estimation, wherein the second WLAN packet is beamformed according to the beamforming steering matrix.

21. The apparatus of claim 19, wherein the means for switching comprises:
means for switching between the plurality of antenna array configurations during the data portion of the first WLAN packet.

22. The apparatus of claim 17, further comprising:
means for determining a portion of the first WLAN packet to switch antenna array configurations based at least in part on a number of antenna array configurations of the plurality of antenna array configurations and a length of the extension portion of the first WLAN packet.

23. The apparatus of claim 17, wherein the first WLAN packet is a single-user (SU) WLAN packet.

24. A non-transitory computer-readable medium storing code for wireless communication, the code comprising instructions executable to:
switch between a plurality of antenna array configurations during reception of a data portion, or an extension portion, or a combination thereof, of a first wireless local area network (WLAN) packet;
determine channel characteristic information associated with the plurality of antenna array configurations based at least in part on the reception of the first WLAN packet; and
transmit a second WLAN packet using an antenna array configuration selected from the plurality of antenna array configurations based at least in part on the determined channel characteristic information; and determining a portion of the first WLAN packet to switch antenna array configurations based at least in part on a number of antenna array configurations of the plurality of antenna array configurations and a length of the extension portion of the first WLAN packet.

* * * * *